(12) United States Patent
Lee et al.

(10) Patent No.: US 7,404,175 B2
(45) Date of Patent: Jul. 22, 2008

(54) SMART GENERATOR

(75) Inventors: William W. Lee, Boston, MA (US); Julian Pelenur, Marblehead, MA (US)

(73) Assignee: Bea Systems, Inc., San Jose, CA (US)

( * ) Notice: Subject to any disclaimer, the term of this patent is extended or adjusted under 35 U.S.C. 154(b) by 1340 days.

(21) Appl. No.: 09/975,690

(22) Filed: Oct. 11, 2001

(65) Prior Publication Data
US 2002/0147763 A1 Oct. 10, 2002

Related U.S. Application Data

(63) Continuation of application No. 09/689,429, filed on Oct. 12, 2000, now Pat. No. 6,944,680.

(60) Provisional application No. 60/239,409, filed on Oct. 11, 2000, provisional application No. 60/238,918, filed on Oct. 10, 2000, provisional application No. 60/238,920, filed on Oct. 10, 2000.

(51) Int. Cl.
G06F 9/44 (2006.01)
G06F 15/16 (2006.01)
(52) U.S. Cl. .................. 717/104; 709/202
(58) Field of Classification Search ............ 717/102, 717/121, 104, 126
See application file for complete search history.

(56) References Cited

U.S. PATENT DOCUMENTS 6,018,627 A * 1/2000 Iyengar et al. ............ 717/103
6,167,564 A   12/2000 Fontana et al.
6,199,195 B1 * 3/2001 Goodwin et al. ............ 717/104
6,269,373 B1 * 7/2001 Apte et al. .................... 707/10
6,332,163 B1 * 12/2001 Bowman-Amuah ......... 709/231
6,601,233 B1 * 7/2003 Underwood ................. 717/102
6,684,387 B1 * 1/2004 Acker et al. ................. 717/126
6,694,508 B1 * 2/2004 Moore et al. ................ 717/121
6,701,517 B1 * 3/2004 Moore et al. ................ 717/121
6,931,625 B1 * 8/2005 Coad et al. .................. 717/109
2006/0059107 A1 * 3/2006 Elmore et al. ................. 705/64

OTHER PUBLICATIONS

Thomas, Anne, "Container-Managed Persistence," Dec. 1998.*
Thomas, Anne, "Container-Managed Persistence," Dec. 1998, pp. 1-12.*
Thomas, A., Container-Managed Persistence Enterprise JavaBeans Persistence Mechanisms, Patricia Seybold Group Strategic Technologies, Best Practices, Business Solutions, Dec. 1998, pp. 2-10.
Improved Process for Visual Development of Client/Server Programs IBM Technical Disclosure Bulletin, Jan. 1998, vol. 41: No. 1: pp. 2-3.

* cited by examiner

*Primary Examiner*—Jason Cardone
*Assistant Examiner*—Azizul Choudhury
(74) *Attorney, Agent, or Firm*—Fulbright & Jaworski LLP

(57) ABSTRACT

The Smart Generator of the present invention allows the designer/developer/user to model the EJB components in a natural way without being concerned with implementation-specific details. The developer models the business objects using a UML drawing tool and the Smart Generator creates a set of classes that implements these objects with reference to the Enterprise JavaBeans specification. That is, the Smart Generator automatically create access methods and handling containment of references from the UML diagram.

20 Claims, 15 Drawing Sheets

SMART GENERATOR

RELATED APPLICATION

This application is a continuation application of U.S. Provisional Application Ser. No. 60/238,918 filed Oct. 10, 2000, U.S. Provisional Application Ser. No. 60/238,920 filed Oct. 10, 2000, U.S. Provisional Application Ser. No. 60/239,409 filed Oct. 11, 2000, and U.S. application Ser. No. 09/689,429 filed Oct. 12, 2000 now U.S. Pat. No. 6,944,680, which are incorporated by reference in their entirety.

BACKGROUND OF THE INVENTION

The present invention relates to apparatus and method for generating Enterprise Java Beans (EJB) components by modeling them using the Unified Modeling Language (UML) and generating the Java source code from the UML models. The present technique utilizes a UML drawing tool, such as Rational Rose™, and creates an intermediate file that describes the EJB component model. The intermediate file is then transformed into the Java classes that make up one or more EJBs.

A component is a reusable software building block; a prebuilt piece of encapsulated application code that can be combined with other components and with handwritten code to rapidly produce a custom application. Components execute within a construct called a container. A container provides an application context for one or more components and provides management and control services for the components. In practical terms, a container provides an operating system process or thread in which to execute the component. Client components normally execute within some type of visual container, such as a form, a compound document, or a Web page. Server components are non-visual and execute within a container that is provided by an application server, such as a Web server, or a database system.

A component model defines the basic architecture of a component, specifying the structure of its interfaces and the mechanisms by which it interacts with its container and with other components. The component model provides guidelines to create and implement components that can work together to form a larger application. Application builders can combine components from different developers or different vendors to construct an application.

Components come in a variety of shapes and sizes. A component can be very small, such as a simple GUI widget (e.g., a button), or it can implement a complex application service, such as an account management function.

In order to qualify as a component, the application code must provide a standard interface that enables other parts of the application to invoke its functions and to access and manipulate the data within the component. The structure of the interface is defined by the component model.

An application developer should be able to make full use of the component without requiring access to its source code. Components can be customized to suit the specific requirements of an application through a set of external property values. For example, the button component has a property that specifies the name that should appear on the button. The account management component has a property that specifies the location of the account database. Properties can be used to support powerful customization services. For example, the account management component might allow a user to add a special approval process for withdrawals over a certain dollar amount. One property would be used to indicate that special approval functions are enabled, a second property would identify the conditions that require special approvals, and a third property would indicate the name of the approval process component that should be called when the condition exists.

The JavaBeans component model defines a standard mechanism to develop portable, reusable Java technology development components, such as widgets or controls. A JavaBeans component (a Bean) is a specialized Java class that can be added to an application development project and then manipulated by the Java development tool. A bean provides special hooks that allow a visual Java development tool to examine and customize the contents and behavior of the bean without requiring access to the source code. Multiple beans can be combined and interrelated to build Java applets or applications or to create new, more comprehensive, or specialized JavaBeans components.

The Enterprise JavaBeans components model logically extends the JavaBeans component model to support server components. Server components are reusable, prepackaged pieces of application functionality that are designed to run in an application server. They can be combined with other components to create customized application systems. Server components are similar to development components, but they are generally larger grained and more complete that development components. Enterprise JavaBeans components (Enterprise Beans) cannot be manipulated by a visual Java development tool in the same way that JavaBeans components can. Instead, they can be assembled and customized at deployment time using tools provided by an EJB-compliant Java application server.

The Enterprise JavaBeans architecture provides an integrated application framework that dramatically simplifies the process of developing enterprise-class application systems. An EJB server automatically manages a number of tricky middleware services on behalf of the application components. EJB component-builders can concentrate on writing business logic rather than complex middleware. The results are that applications get developed more quickly and the code is of better quality.

Code generation from UML has not been widely pursued for a number of reasons: the generated code has been viewed as being inferior; no easy way to generate the implementation of the business logic; lack of round trip engineering support (i.e., no iterative development cycle), which means that presently available tools can only be used to generate the first attempt at the classes, i.e., no mechanism or provision for upgrades, revisions, etc.; and the problem of synchronizing the model and code, thereby diminishing the value or usefulness of the model.

OBJECTS AND SUMMARY OF THE INVENTION

Therefore, the present invention proceeds upon desirability of overcoming the shortcomings of the prior art. The present invention, referred to herein as the "SmartGenerator™ or Smart Generator," allows the designer/developer/user to model the EJB components in a natural way without being concerned with implementation-specific details. The developer models the business objects using a UML drawing tool and the Smart Generator creates a set of classes that implements these objects with reference to the Enterprise JavaBeans specification. That is, many of the laborious tasks of creating access methods and handling containment of references is automatically handled by the Smart Generator.

Additionally, the Smart Generator uses intelligent algorithms to generate sensible naming for collections and methods. Further, the Smart Generator generates documentation for these classes using the same intelligent naming scheme. Preferably, the SmartGenerator embeds code markers, thereby permitting developers to add the business logic and then resynchronize those changes with the model.

In accordance with an embodiment of the present invention, the Smart Generator generates code for Enterprise JavaBean (EJB) components from a business process by graphically modeling the business process using a UML drawing tool to provide an UML model having a plurality of EJB Classes. The Smart Generator defines the relationships between each EJB class, stereotypes each EJB class into one or more EJB components, preferably eBSC components, and transforms each of the EJB components into EJB source code.

In accordance with an embodiment of the present invention, the Smart Generator uses the Code Template Dictionary (CTD) to generate the Java code.

Various other objects, advantages and features of this invention will become readily apparent from the ensuing detailed description and the appended claim.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENTS

Figure 1:
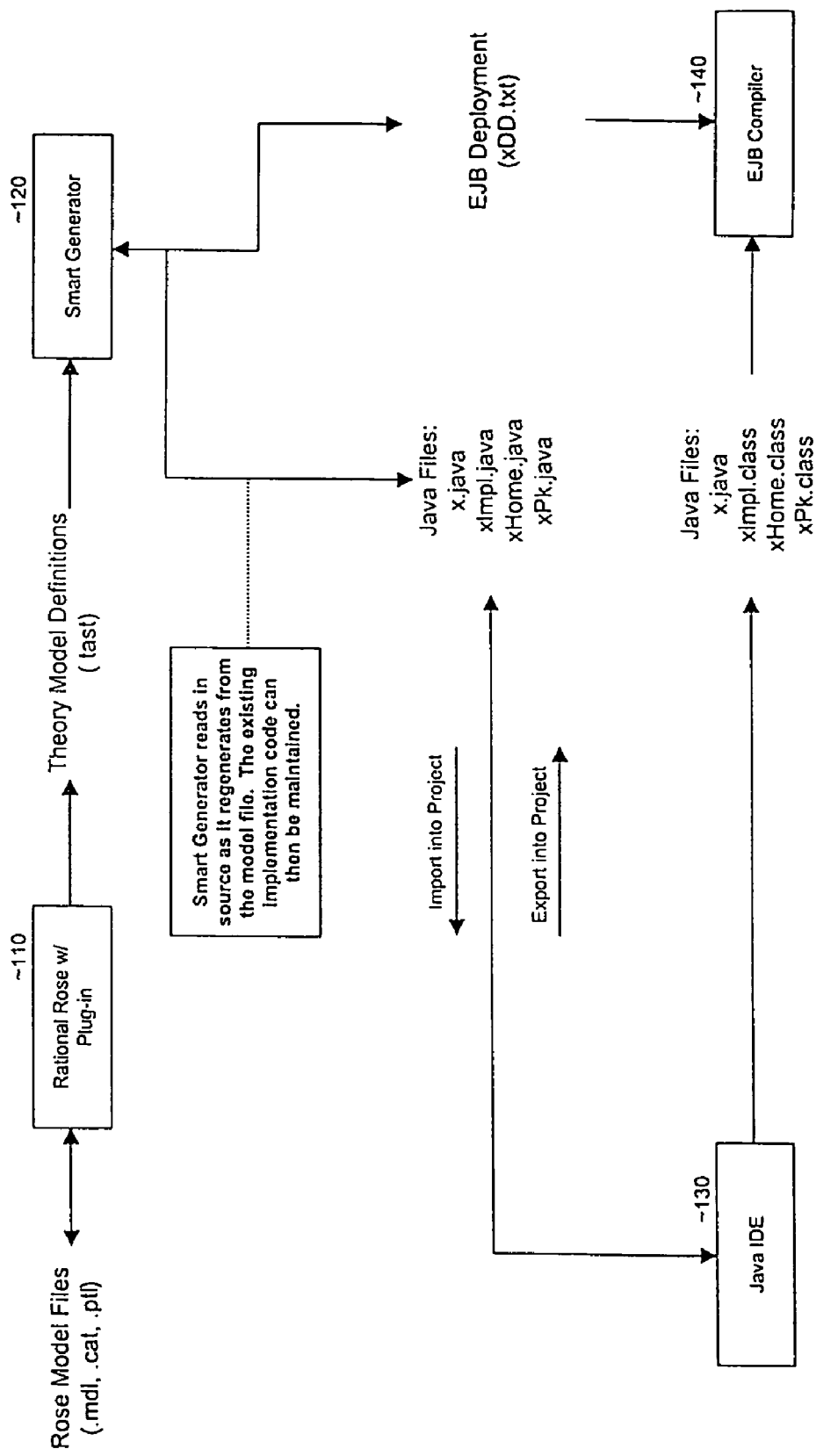
FIG. 1 is a flow diagram of the components development process incorporating the Smart Generator in accordance with an embodiment of the present invention.

The present invention provides apparatus and method (SmartGenerator™ or Smart Generator) for generating Enterprise Java Beans (EJB) components by modeling them using the Unified Modeling Language (UML) and generating the Java source code from the UML models. The present technique utilizes a UML drawing tool, such as Rational Rose™, and creates an intermediate file that describes the EJB component model. The intermediate file is then transformed into the Java classes that make up one or more EJBs. In other words, the Smart Generator automatically creates all the source code, object definitions, object relationships, documentation, and EJB-required files from the UML diagram or representation. Adding a relationship between two EJB objects is as simple as drawing a line between them (see FIG. 7).

EJB is a component architecture for creating scalable, multi-tier, distributed applications, and it makes possible the creation of dynamically-extensible application servers. EJB provides a framework for components that may be "plugged in" to a server, thereby extending that server's functionality. Enterprise JavaBeans™ (EJB™) technology defines a model for the development and deployment of reusable Java™ server components. Components are pre-developed pieces of application code that can be assembled into working application systems. Java technology currently has a component model called JavaBeans™, which supports reusable development components. The EJB architecture logically extends the JavaBeans component model to support server component.

Server components are application components that run in an application server. EJB technology is part of Sun's Enterprise Java platform, a robust Java technology environment that can support the rigorous demands of large-scale, distributed, mission-critical application systems. EJB technology supports application development based on a multitier, distributed object architecture in which most of an application's logic is moved from the client to the server. The application logic is partitioned into one or more business objects that are deployed in an application server.

The Smart Generator allows the designer to model the EJB components in a natural way without being concerned with implementation-specific details. The utilities do not assume a direct mapping from the model to the underlying language constricts. The user models the business objects and the Smart Generator creates a set of classes that implements these objects with reference to the Enterprise JavaBeans specification. Many of the laborious tasks of creating access methods and handling containment of references is automatically handled by the Smart Generator.

The user models the business objects and the Smart Generator creates a set of classes that implements these objects with reference to the Enterprise JavaBeans specification. Many of the laborious tasks of creating access methods and handling containment of references is automatically handled by the Smart Generator. In accordance with an embodiment of the present invention, the Smart Generator also uses intelligent algorithms to generate sensible naming for collections and methods. In addition, the Smart Generator generates documentation for these classes using the same intelligent naming scheme. Preferably, the Smart Generator embeds code markers, thereby permitting developers to add the business logic and then resynchronize those changes with the model.

Turning now to FIG. 1, there is illustrated a flow diagram of the components development process using the Smart Generator in accordance with an embodiment of the present invention. It is appreciated the developer can utilize the Smart Generator to develop a new business component or to extend existing components. Before the user or developer initiates the components development process, the installed components model for a particular business domain, such as the "WeblogicCommerce.mdl" model file, is copied to the work directory. For example, in the development of "WebLogic Commerce Server (WLCS) components, the developer may go to the "model\BEA WeblogicCommerce\" directory under the WLCS installation directory to locate the components model. The developer then creates a subdirectory for storing the working copy of the components model.

Exporting the Components Model

In step 110, the developer/user initiates the components development process by opening the working copy of the components model in a UML drawing tool, such as the Rational Rose™, and exporting the components model to an intermediate definition file (*.tast) using a plug-in to Rational Rose. For example, in the development of the WLCS components, the developer may export the components model in the following manner:

1. Starts Rational Rose from the "Windows Start" menu by selecting Start→Programs→Rational Rose.
2. From the Rational Rose top-level menu, clicks File→Open, and browses the directory to locate the working copy of the components model file, such as the "WebLogicCommerce.mdl" file.
3. Double clicks on the WeblogicCommerce.mdl file to enable Rational Rose to open the components model.
4. From the Rational Rose top-level menu, clicks Tools→WeblogicCommerce→Export Model As.
5. The plug-in to Rational Rose displays a screen to save the components model in an intermediate file.
6. Enters a file name for the model definition file, wherein the default file type is .tast.
7. The plug-in to Rational Rose displays a confirmation message when the export operation is successfully completed.

Running the Smart Generator

From the Rational Rose menu, or the Windows Start menu, or a command prompt, the components development process activates the Smart Generator in step 120. The Smart Generator is a Java application that reads the *.tast model definition file and generates the Java source files based on an industry standard modeling language and EJB deployment descriptors.

In accordance with an embodiment of the present invention, the Smart Generator generates EJB codes that are optimized for the high performance demands of interactive e-commerce Web applications. The Smart Generator enables the developer/user to focus on building his/her company's business logic without knowing the details of EJB or tracking changes in the EJB Specification, and enables reusability and customization of pre-built EJB components.

Also, the Smart Generator embeds code markers in the Java source files to enable the developer update the generated Java source file (i.e., add business logic), and track and synchronize changes to the Java source file with the components model in step 120. That is, if Java source files have been updated, the Smart Generator reads in the changes the next time it runs, preserves the changes, and reflects the changes back in working copy of the component model. The Smart Generator uses these code markers to synchronize the component model with the business logic code.

Figure 2:
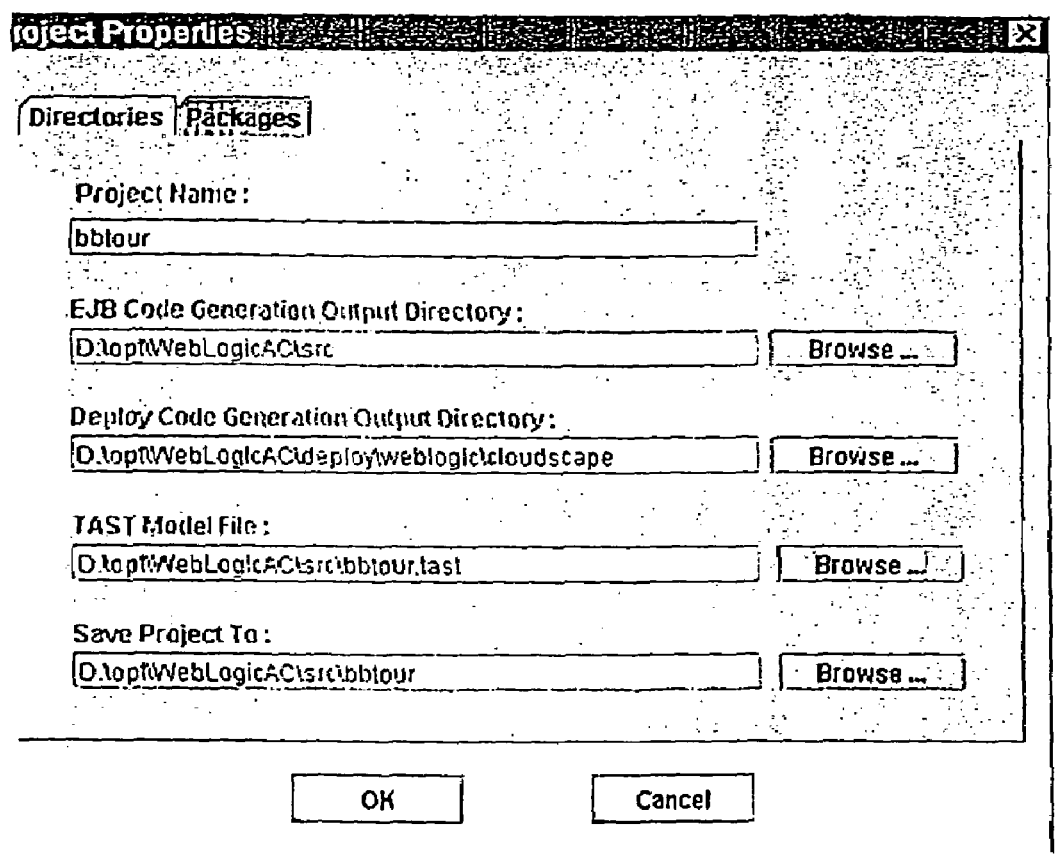
FIG. 2 is a screen shot of an example of "Project Properties" screen.

In accordance with an embodiment of the present invention, the components development process enables the developer/user to define a new Smart Generator project in the following manner:

1. Starts the Smart Generator by using one of the following options:
   From the Rational Rose top-level menu, selects Tools→WeblogicCommerce→Smart Generator.
   From the Windows Start menu, selects Start→Programs→BEA WebLogic Commerce Server→Smart Generator.
   From a system prompt, runs the script that starts the Smart Generator, which is implemented as a Java application. On Windows systems, the smart-generator.bat file is in \bin\win32\ in the installed directory. On Solaris systems, the smart-generator.sh file is in /bin/solaris2/ in the installed directory.
2. On the initial Smart Generator screen, clicks the New button.
3. Smart Generator displays the "Project Properties" screen, as shown in FIG. 2.
4. In the "Project Name" field, enters a descriptive project name.
5. In the "EJB Code Generation Output Directory" field, enters the location for the generated Java source files. This is the location where Smart Generator will place the Java interfaces, business logic, and other core EJB code.
6. In the "Deploy Code Generation Output Directory" field, enters the location for the generated deployment code source files. This is the location where Smart Generator will place deployment descriptors and files containing JDBC instructions to persist Entity Beans using a specified database map. JDBC is an abbreviation for Java Database Connectivity, a Java application program interface (API) that enables Java programs to execute SQL statements. This allows Java programs to interact with any SQL-compliant database.
7. In the "TAST Model File" field, enters the name of the *.tast file exported from the working copy of the component model in step 110.
8. In the "Save Project To" field, designates a directory that will contain the project definition file.
9. Clicks the "OK" button.

Figure 3:
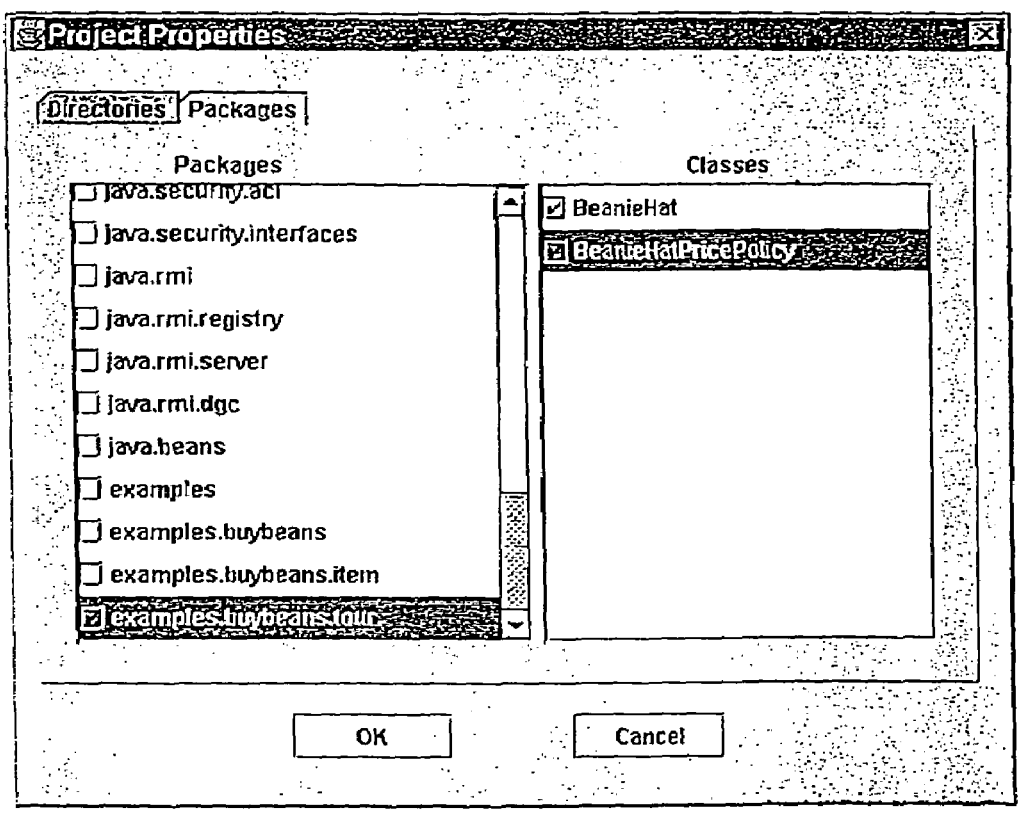
FIG. 3 is a screen shot of an example of another "Project Properties" screen.
Figure 4:
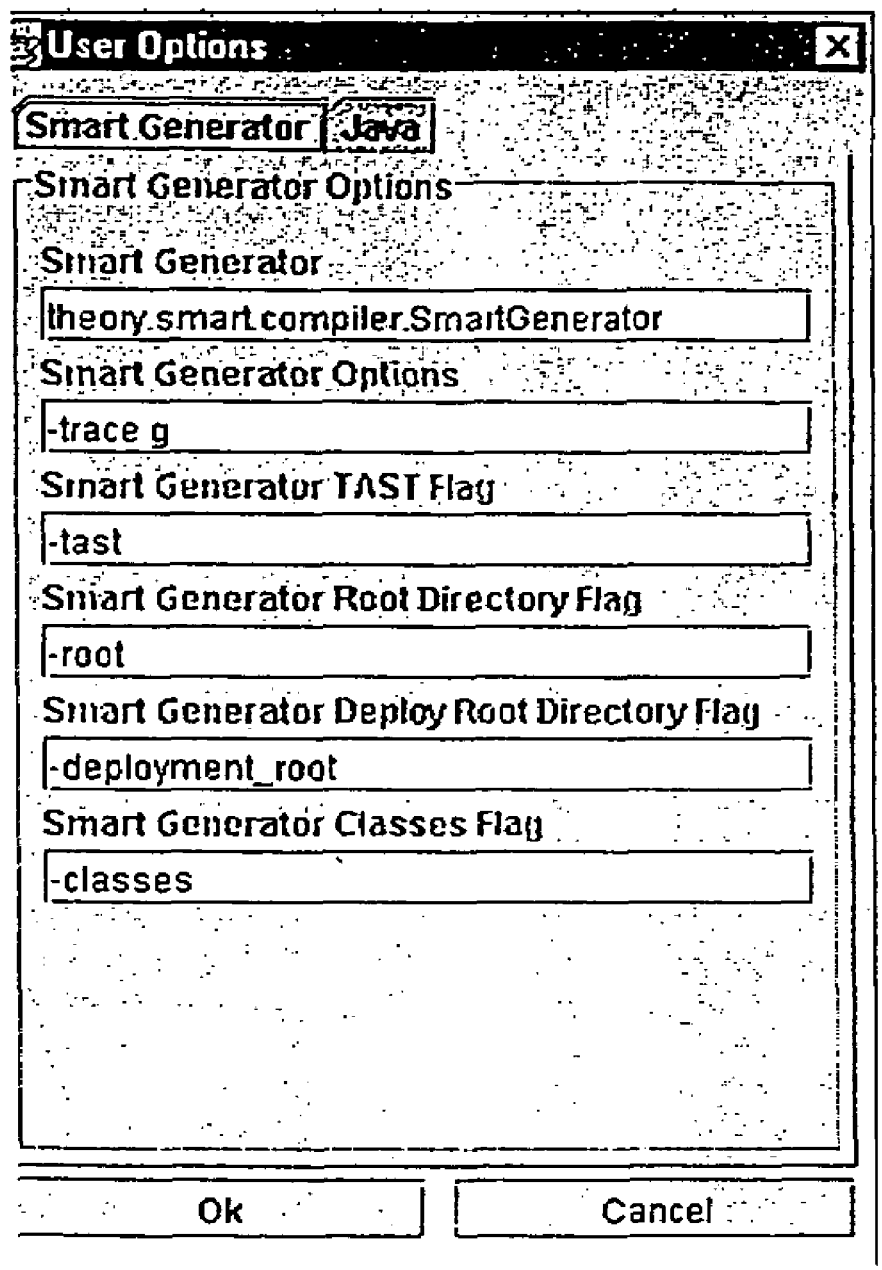
FIG. 4 is a screen shot of an example of a "User Options" screen.

In accordance with an embodiment of the present invention, the components development process presents the developer/user to configure the defined Smart Generator Project in the following manner:

1. Clicks on the Packages tab on the "Project Properties" Screen, as shown in FIG. 3.
2. In the Packages pane, clicks on the desired package(s) to implement.
3. In the Classes pane, double-clicks on the boxes next to the desired classes to implement. It is appreciated that double-clicking of the boxes by the developer/user adds checkmarks next to selected classes.
4. Clicks the "OK" button.
5. Selects Configuration→Options from the Smart Generator menu. An example of the "User Options" screen is shown in FIG. 4.
6. The developer can additionally select the following options on the "User Options" screen:
   trace sets the trace switch. The default value is "g", which enables a code generator trace. Other options include: -trace c (compiler trace), -trace t (tast processor trace), and –trace+(trace all);
   tast sets the metadata exchange format;
   root sets the location of the root directory for the java source files to be generated;
   deployment_root sets the root directory for output of deployment-specific code; and classes (c1, c2, c3) allows the developer/user to specify a subset of classes to be processed by the next "generate" operation in the Smart Generator. Multiple entries can be enclosed in parentheses, separated by a comma. There is no default.

bmp is a switch to specify that the Bean-Managed persistence should not be used. In other words, this turns off the bean-managed persistence, thereby enabling the developer/user to use container-managed persistence. The default is to deploy with this switch "on" using bean-managed persistence on a relational database such as Oracle. In the default "on" mode, the Smart Generator references a database mapping properties file to generate the appropriate database-related code.

Figure 5:
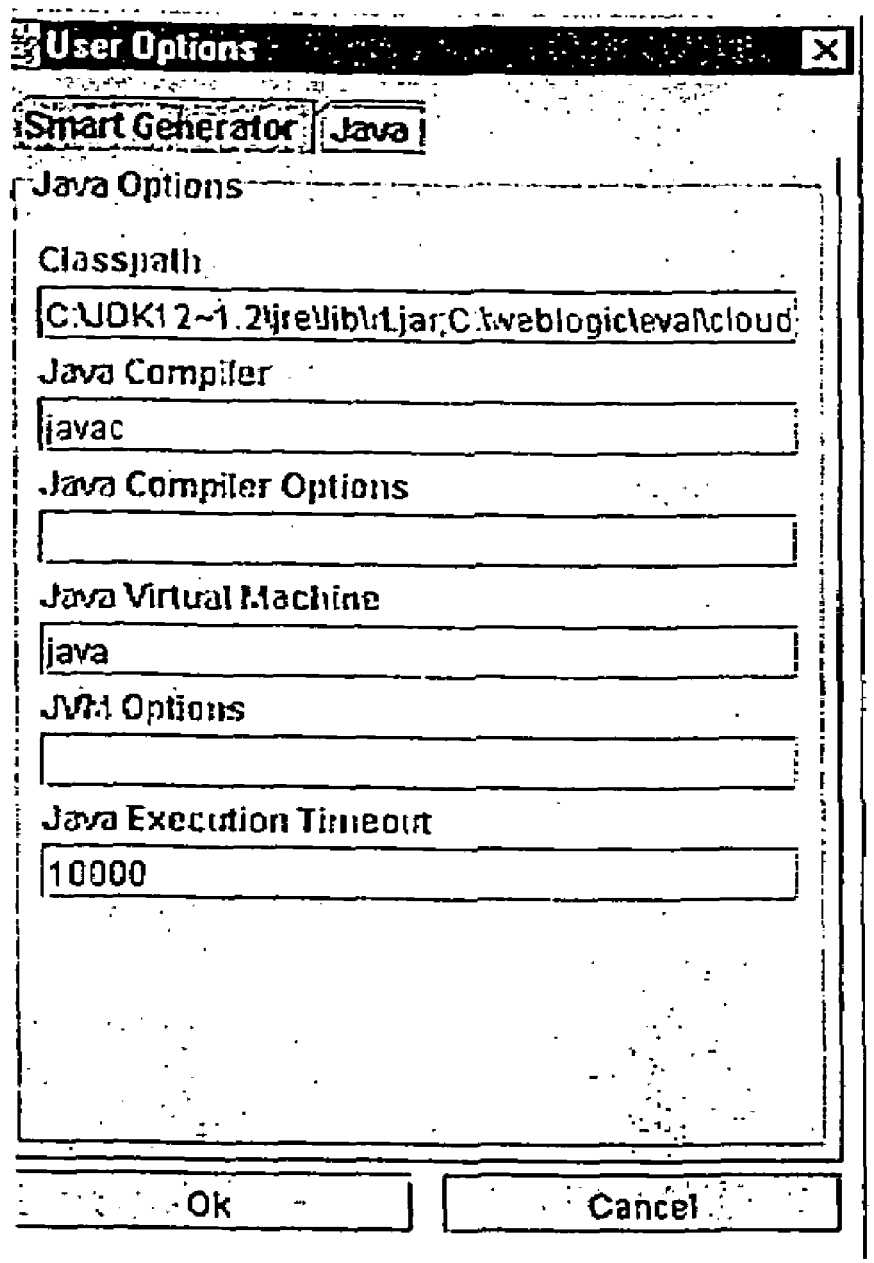
FIG. 5 is a screen shot of an example of another "User Options" screen.

7. On the "User Options" screen, the developer/user can click the Java tab to specify Java compiler options, as shown in FIG. 5.
8. Click the "Ok" button after entering any compiler options.

Figure 6:
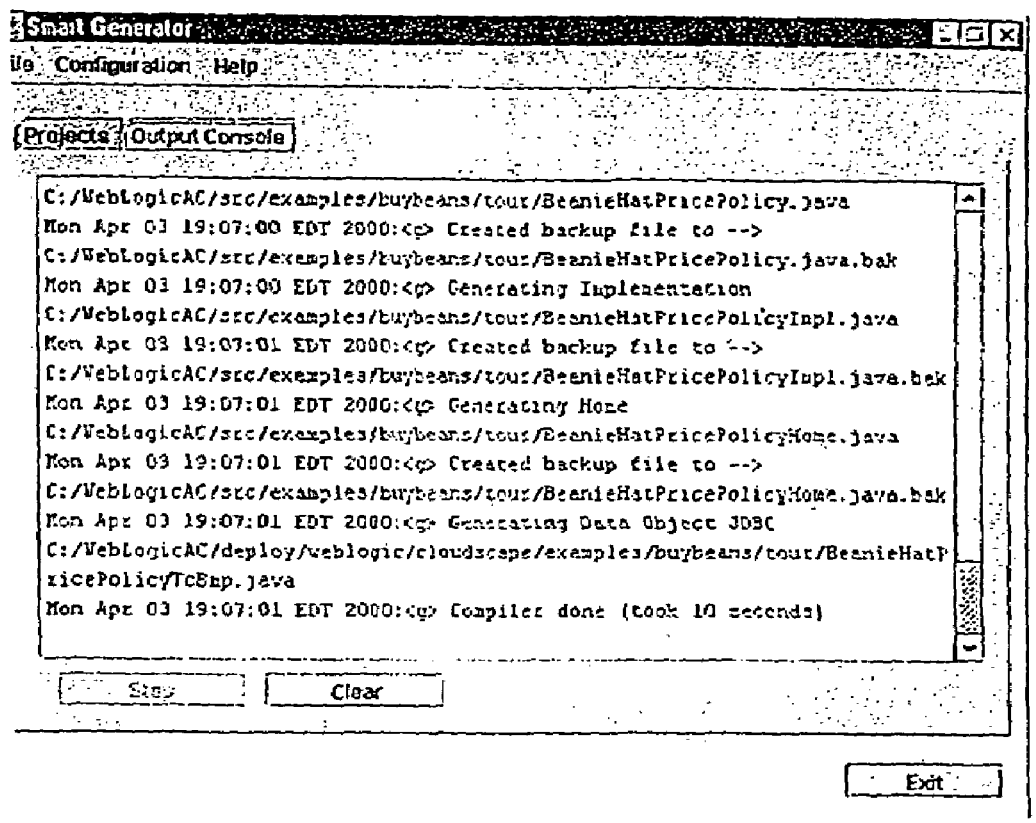
FIG. 6 is a screen shot of an example of an "Output Console Message" screen.

After defining and configuring the Smart Generator Project, the developer/user can click the "generate" button on the main Smart Generator screen (not shown) to generate the Java source code. In accordance with an embodiment of the present invention, the developer/user can click the "Output Console" tab to view messages recorded during the generation process as shown in FIG. 6. When the Smart Generator completes the compilation process or the generation of EJB codes, the Smart Generator outputs the "Compiler done" message at the end of the console output. The developer/user can click the "Exit" button to close the Smart Generator.

Edit Java Files

The developer/user can edit the generated Java source files to add business logic between the provided code markers in step 130. The Smart Generator uses the code markers to synchronize the component model (working copy) with the added business logic. That is, the next time the Smart Generator is activated, the Smart Generator recognizes the changes made to the source file and reflects the changes in the component model. The following sample code fragments of the generated implementation file, e.g., BeanieHatPricePolicy.java shows the type of code markers that are provided by the Smart Generator. A bold typeface is used in the listing to highlight the markers. In all cases, the end tag, such as $_End, appears before the closing brace of the additional method.

```
Package examples.buybeans.tour;
import theory.smart.foundation.*;
import theory.smart.util.*;
//$Import$_Begin ------------ CUSTOM CODE ---------------
// Place additional import statements here
//$Import$_End
.
.
.
class BeanieHatPricePolicyImpl implements BeanieHatPricePolicy
//$Implements$_Begin ------------ CUSTOM CODE ------------
// Add interfaces that are implemented here
//$Implements$_End
.
.
.
//$AdditionalAttributeDeclarations$_Begin ----- CUSTOM CODE -----
------
// Add additional attribute declarations here
//$AdditionalAttributeDeclarations$_End
```

-continued

```
.
.
.
protected BeanieHatPricePolicyImpl( )
{
super( );
//$Constructor$_Begin ------------ CUSTOM CODE ---------------
// Add constructor code here
//$Constructor$_End
}
.
.
.
//$MethodException theory.smart.axiom.units.Price
calculatePrice(theory.smart.ebusiness.item.Item item,
theory.smart.axiom.units.Quantity qty,
theory.smart.ebusiness.customer.Customer customer)$_Begin ---------
--- CUSTOM CODE ---------------
// Add additional exceptions here
//$MethodException theory.smart.axiom.units.Price
calculatePrice(theory.smart.ebusiness.item.Item item,
theory.smart.axiom.units.Quantity qty,
theory.smart.ebusiness.customer.Customer customer)$_End {
//$Method theory.smart.axiom.units.Price
calculatePrice(theory.smart.ebusiness.item.Item item,
theory.smart.axiom.units.Quantity qty,
theory.smart.ebusiness.customer.Customer customer)$_Begin ---------
--- CUSTOM CODE ---------------
return null; //in Components Tour, custom pricing policy
    code in WLCS documentation is inserted here...
//$Method theory.smart.axiom.units.Price
calculatePrice(theory.smart.ebusiness.item.Item item,
theory.smart.axiom.units.Quantity qty,
theory.smart.ebusiness.customer.Customer customer)$_End

}
.
.
.
```

In accordance with an embodiment of the present invention, the Smart Generator includes a round-trip engineering feature that matches the exact signature of the method and the parameters to synchronize the component model with the added business logic.

EJB Compiler

The EJB compiler generates Java class files for the described EJB components. Preferably, EJB compiler generates container classes according to the deployment properties specified in deployment files in step 140. In accordance with an embodiment of the present invention, the components development process can run the EJB compiler against the Java source files in the following manner and the beanname-CMP-RDBMS.xml.

1. Create files ejb-jar.xml and weblogic-jar.xml and for container-managed persistence (CMP) deployments.
2. Create a deployment Java Archive (JAR) file that contains the xml files and the Home, Remote and Impl class files. To do this, use the syntax jar cvf<jar-file> <files . . .>, e.g., jar cvf morehats.jar propeller.class button.class
3. Run EJB compiler on the deployment JAR. The server and client stubs are generated inside the deployment JAR.
4. Finally, copy the application JAR files to the deployment system that will host the application.

The EJB compiler tasks for subsequent builds can be automated by creating a build script file, such as *.bat (NT) or *.sh (Solaris). In addition to generating the *.class bytecodes for the desired application, the script creates or updates the Java Archive (JAR) file for the application.

Deploying the Application

The components development process deploys the application using either Bean-Managed Persistence (BMP) or Container-Managed Persistence (CMP) to the server, the host system or systems. The WLCS Server on each machine that hosts the application is then started.

Before starting the application server in the WLCS components example, the developer/user performs the following:

- Set the environment variable "DEPLOYMENT_SET" to either BMP for bean-managed persistence, generation components, or CMP for container-managed persistence.
- In the installed WLCS directory rename the appropriate weblogic-XXX.properties file to weblogic.properties, where XXX is either BMP or CMP. The renamed file resides in the top-level WLCS installed directory, such as c:\webLogicCommerce.
- In the installed WLCS directory rename the weblogiccommerce-XXX.properties file to weblogiccommerce.properties, where XXX is either BMP or CMP. The renamed file resides in the top-level WLCS installed directory, such as c:\webLogicCommerce.

It is appreciated that the EJB source code is independent of the persistence method, whether it is container-managed or any implementation of bean-managed persistence. The source code that uses JDBC instructions to persist Entity Beans is generated according to one of the reference implementations of bean-managed persistence. If the reference data model is used, then the generated source code can be used without any modification. Alternatively, the JDBC source code can be used as templates to persist EJBs to a legacy data model. One of the advantages of the present techniques is that business logic and other core EJB source code is independent of the persistence implementation. This advantageously isolates business application development from database development and schema changes.

Using the components development process, the developer/user can change the working copy of the components model by adding new components or business policies that extend the ones provided in the general component model by repeating the steps 110-140 and deploying the modified application. Smart Generator preserves the changes made to the source files by locating additions within the code markers.

To change the working copy of the component model, the developer/user needs a basic understanding of a simple subset of the notations, the foundation package and the Smart Generator rules.

The foundation package is a set of classes from which EJB components are built. These set of classes provide the building blocks for the value added features of the business components. Most of the classes that are generated from the model are derived from classes in the foundation package. For example, the "theory.smart.ebusiness" package contains classes that are built on the foundation package. To simplify the complexity of the UML diagrams, the foundation package relationships are described through class stereotypes rather than inheritance. Each of these stereotypes is used to model certain behaviors and implies the presence of additional methods. The following concepts used in the foundation package: Belongings, Sessions, Entity, Configurable Entity, Business Policy, Workflow, and Smart Features.

Belongings

A Belonging, the simplest form of Smart Component, preferably, eBusiness Smart Component, is a lightweight, local object that can be serialized. A Belonging gets its name because it must "belong" to, or be acquired from, another object, typically a Session or Entity. It must be serializable so that it can be persisted with the class to which it belongs and passed remotely as a parameter.

One of the characteristics of a Belonging is that it must be implemented using the abstract factory pattern. This means that for each Belonging there is a home class, an interface, and at least one implementation of that interface. In other words, an EJB object is not created using new class, but instead created using a home class. Since access to the object is through an interface, there is a guaranteed level of abstraction. This provides a great deal of flexibility because it enables the developer/user to substitute implementations. For example, one can make the object remote without changing the code that uses it. Alternatively, one can substitute different business logic at runtime by changing the implementation returned by the home class.

Implementing all these classes by hand is lot of work. The component development process of the present invention has simplified the process by generating all of the necessary classes automatically, thereby enabling the developer/user to concentrate on modeling the attributes and methods so that they fit the desired business needs and requirements.

Sessions

Session components (implented as Session EJBs) are used to model service-oriented objects. The key concept is that a Session is an object or Bean that provides access to a service implemented in itself or somewhere else on the network. Attributes of a session are used only to configure it for use during the lifecycle of that session. It is important to note that the attributes of a Session are not persistent. The business methods are the most important part of a Session.

Sessions provide a way of remotely implementing business logic, thus extending the reach of the client application. For example, when one needs to perform an extended set of operations on a collection of remote objects, it is desirable to create a "Manager". The Manager object can be co-located with the objects it will be operating on. This will advantageously reduce the network overhead and latency.

Sessions are also commonly used to provide an interface to a legacy system or to a service that is pinned to a specific piece of hardware. The remote interface allows the client software to access the remote device as if it were local.

Finally, by wrapping a subsystem and factoring out the functions common to similar systems it is possible to provide a level of redundancy, e.g., when there are multiple providers of credit card validation services. These systems would likely have similar function but different implementations. By creating a common interface to use the different implementations, it is possible to load balance between them or substitute one for the other.

Entity

An Entity (implemented as an Entity EJB) is an object with staying power. Persistence is the key aspect of an Entity Bean or object. An Entity object represents information persistently stored in a database. Entity objects are generally annotated with database transactions and can provide data access to multiple users. In its simplest forth, an instance of an entity could be the equivalent of a single row in a relational database. This is an over-simplification because each Entity may include collections of attributes and implement business methods.

Entities are representative of the attributes of which they are composed. This is what distinguishes them from Sessions, which represent a collection of services. As a general rule Entities do not implement sophisticated business logic, instead, they are the components that are acted upon.

There are two types of persistence in Entity Beans, Container-managed persistence and Bean-managed persistence. For Container-managed persistence, the EJB container is responsible for saving the Bean's state. Since it is container-managed, the implementation is independent of the data source. The container-managed fields need to be specified in the Deployment Descriptor and the container automatically handles the persistence. For Bean-managed persistence the Entity Bean is directly responsible for saving its own state. The container does not need to generate any database calls. Hence, the implementation is less adaptable than the previous one as the persistence needs to be hard-coded into the Bean.

Configurable Entity

In addition to the standard qualities associated with an EJB Entity, the present invention provides dynamic configuration. Dynamic configuration is the ability to add properties and methods at runtime and is provided by the Configurable Entity. The Configurable interface allows the programmer to associate a named value with the Entity. These values are persisted separately so that they are permanently associated with the object without affecting the underlying schema.

When the value stored in a Configurable Entity is a method, the result is the ability to exchange the implementation of a method dynamically or a "Pluggable Method" which is the implementation of the "Strategy" pattern.

Business Policy

Configurable Entities can be arranged in a hierarchy of successors. When such hierarchy is in place, a request to retrieve a value from a Configurable Entity triggers an upward search through the hierarchy of successors until a matching value is found or the top of the hierarchy is reached. This is the implementation of the "Chain of Responsibility' design pattern.

The combination of "Pluggable Methods" and the hierarchy of succession referred to herein as the "Business Policy".

Workflow

For many business applications a simple mechanism to maintain internal state is all that is required to achieve a basic level of workflow. The present invention provides such a capability for defining and verifying the states and events that describe a business process. The developer can represent the business process as a state diagram and then verify the legitimacy of business method invocations with a single method call to ask for a transition. Therefore, adding a step is as simple as adding a new state. The engine will then enforce the rule that this step must be taken without changes to existing code.

The components development process of the present invention has designed and integrated advanced features into the Smart EJB components, such as the SmartKey, SmartHandle, and SmartValue. Accordingly, these smart features of the present invention considerably improve the ease of use and efficiency of the final system.

SmartKey

The EJB specification requires that for each Entity there is a class that represents the attributes of the primary key of that class. This Primary Key class is used to find and test the equality of instances of Entity objects. To accomplish these simple goals the EJB specification only requires that the Primary Key class must be serializable.

The SmartKey interface of the present invention extends this functionality and requires the implementation of the Comparable interface from the java collection API. This is so that SmartKeys can be easily compared and stored in ordered lists. The result is that it is easy to model relationships that require the ordering of Entities. The to "String" method of a SmartKey simplifies the implementation of profiling and debugging code.

SmartHandle

The EJB specification provides for the passing of lightweight references to Enterprise Java Beans through the use of Handles. A handle in EJB is an opaque type that can be converted to and from an EJB Object. A handle is required to implement a test for equality such that given two handles it is possible to determine if they refer to the same Session or Entity object.

For a Smart Entity component, a SmartHandle that includes the object's associated SmartKey can be generated. The SmartHandle excludes the capability of EJB Handle. Since the SmartKey implements the Comparable interface, it is a list of Smart Handles can be ordered without accessing the remote objects that they refer to. This simple mechanism greatly improves performance.

SmartValue

Each Entity is composed of the attributes that describe it. In order to encapsulate the remote objects all attributes must be read and written through accessor methods, typically named get <Attr> and set <Attr>. This has the negative consequence in that retrieving the attributes of an entity may result in many remote method invocations. To alleviate this problem the Smart features of the present invention provides a convenience class, derived from SmartValue, that contains a copy of all the top-level attributes.

Modeling Concepts

Figure 7:
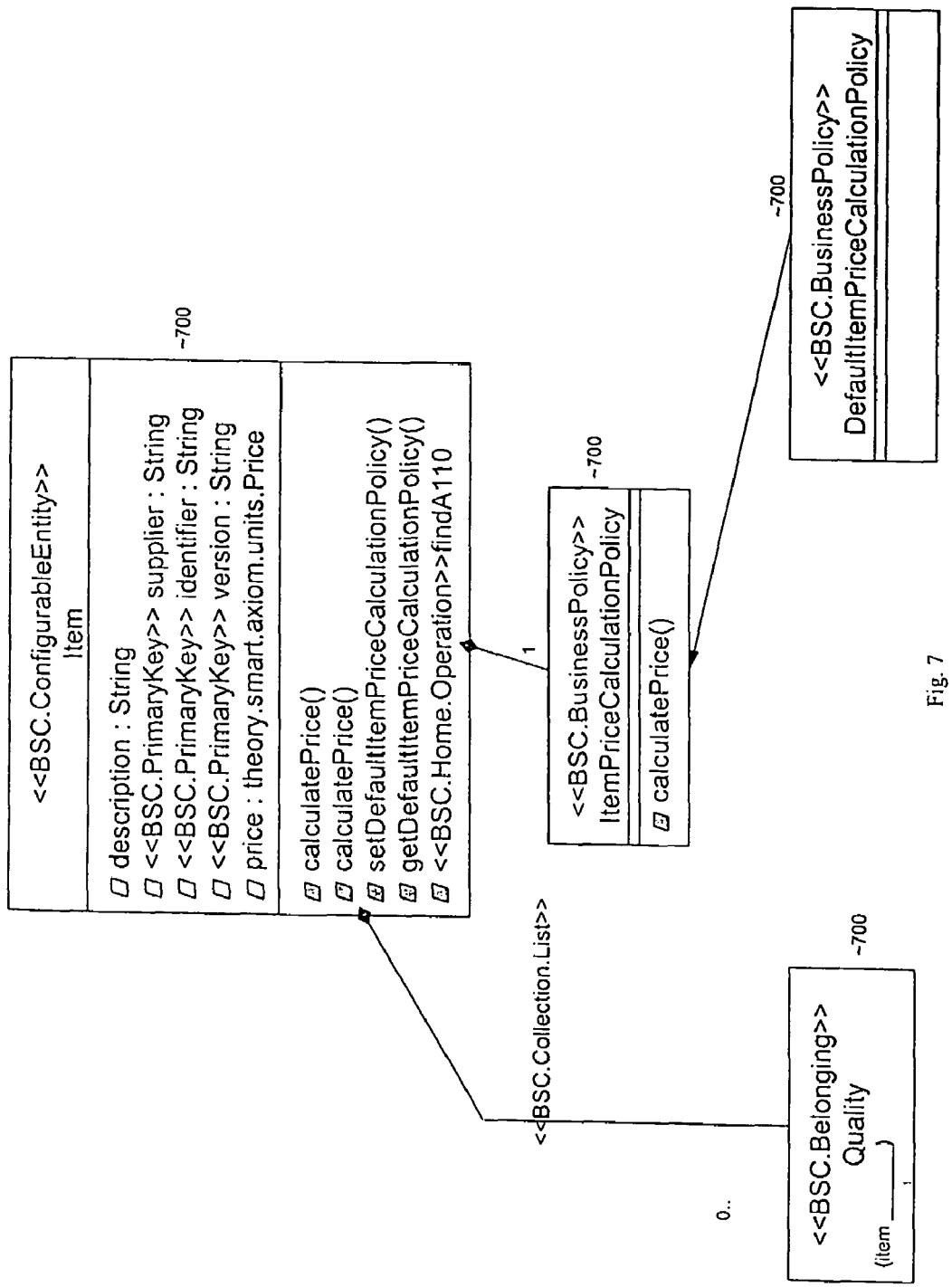
FIG. 7 is a sample UML.

The Unified Modeling Language describes objects and their relationships graphically. The present invention has adopted this industry standard as a mechanism for simplifying the design and implementation of Enterprise Java Beans. Turning now to FIG. 7, there is illustrated a sample UML for describing the UML notation that are used by the Smart Generator.

Classes and Stereotypes

Each of the rectangles in a UML diagram, as shown in FIG. 7, is a representation of a class in UML. There are generally three compartments in each class box. A compartment may be left out if it is empty or if the details of the contents are not pertinent to a particular diagram. The latter is often the case when an object from another package is being referred to.

Figure 8:
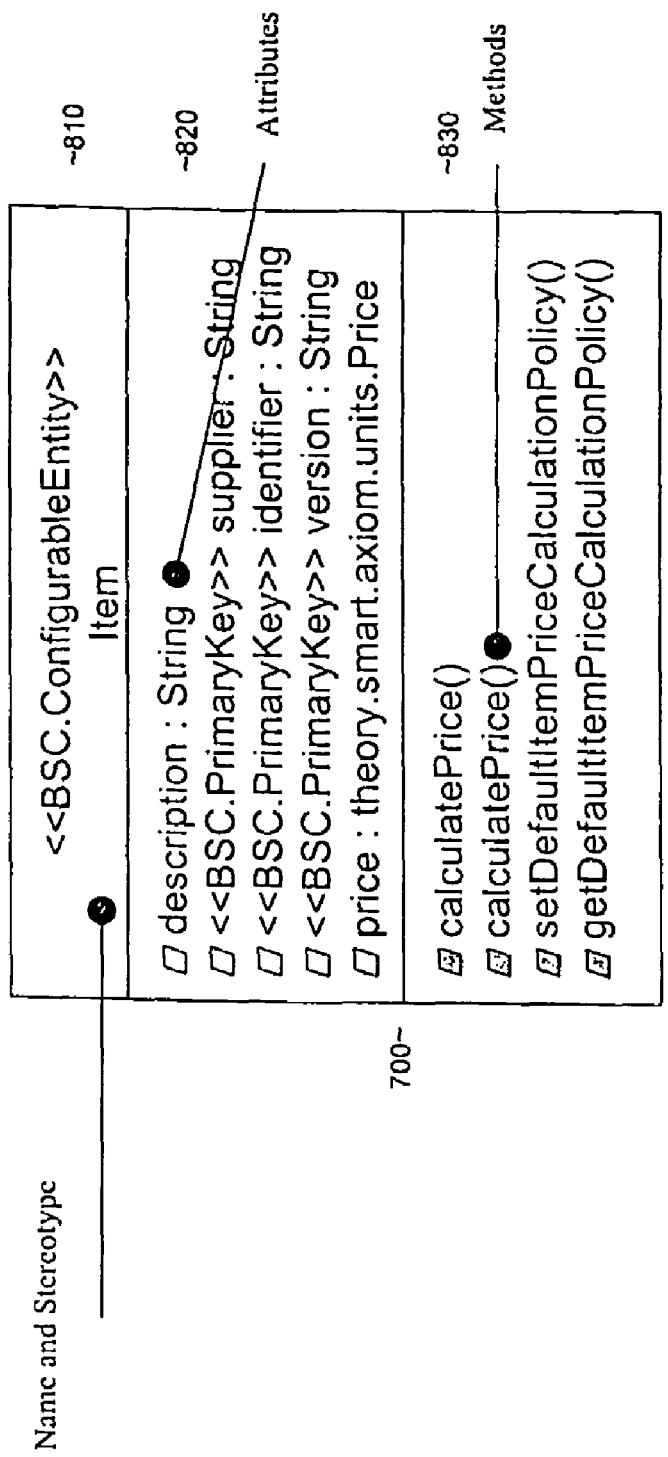
FIG. 8 is an example of class and stereotype in accordance with an embodiment of the present invention.

The upper most box or compartment 810 is FIG. 8 holds the class name and its stereotype. A stereotype is a "sub-classification" of an element in the model. It is represented as the name of the stereotype enclosed in guillemets, as in <<stereotype>>. In the UML pretty much anything can be tagged with a stereotype. In FIG. 8, the Item class is stereotyped as a Configurable Entity. This means that it would have the qualities of one as described in the section Entity.

Attributes are listed in the second compartment 820. In UML, the name of the attribute is specified first followed by its type. The name and the type are separated by a colon. It is notable because it is different from the Java language. This works well for object oriented modeling which is generally an iterative process. Often tines a designer will list the attributes of class with out specifying types the first time through. The same technique holds true when specifying the arguments to a method. It is appreciated that the attributes can be decorated with a stereotype. The stereotype precedes the attribute and is embedded in guillemets as before.

The third and final compartment 830 lists the methods. The return type is listed after the closing parentheses and is separated from the class definition with a colon. Often times the display of the parameters and the return value are suppressed on the UML diagram because they consume a great deal of space. When specifying attributes and methods in the UML, one can connote whether or not they are private, protected, or public. The "tilted brick" icon to the left has slight variations depending on the status of the attributes and methods.

Figure 9:
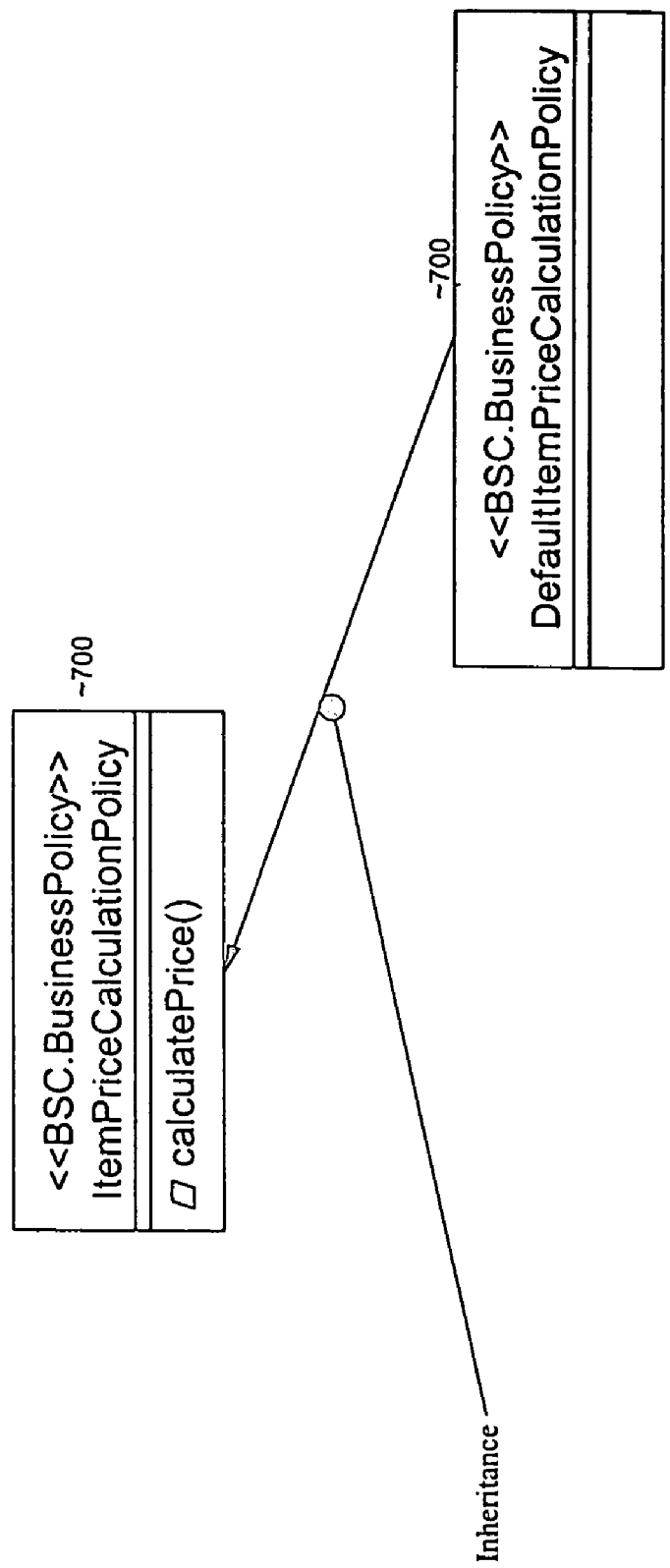
FIG. 9 is an example of inheritance in accordance with an embodiment of the present invention.

An inheritance is depicted on a UML diagram as an unfilled arrow that points from the subclass towards its parent. In FIG. 9, the ItemPriceCalculationPolicy has a calculatePrice method through inheritance. The subclass shares all of the properties and attributes of its parent.

An aggregation is used to describe a containment relationship between classes. This is an alternative to simply defining an attribute with the type of the class. In UML, the contained object shares a life cycle with the containing object. That is, the containing object holds the only reference to it and is responsible for removing the object upon when it, itself, is removed.

Figure 10:
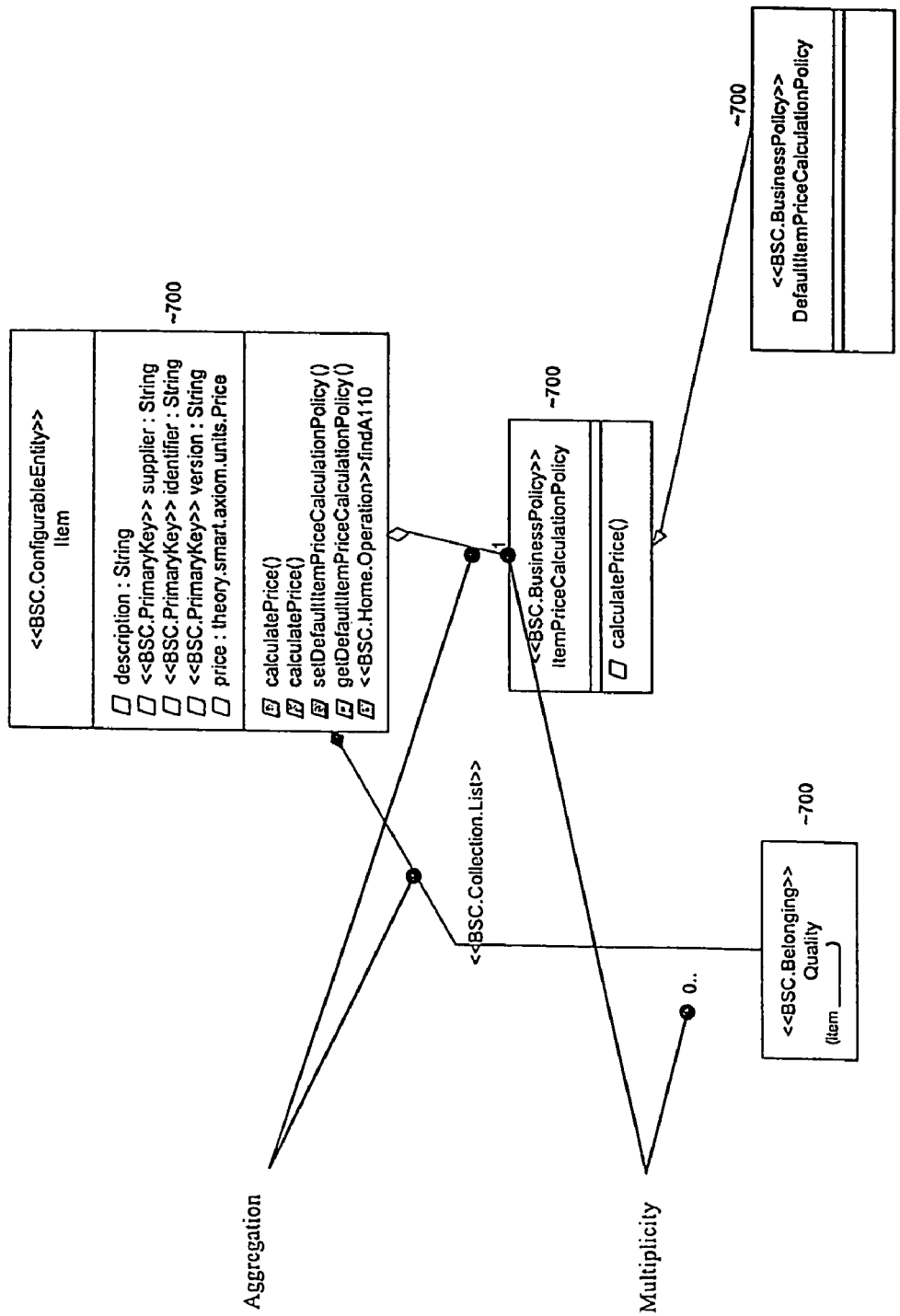
FIG. 10 is an example of aggregation and multiplicity in accordance with an embodiment of the present invention.
Figure 11:
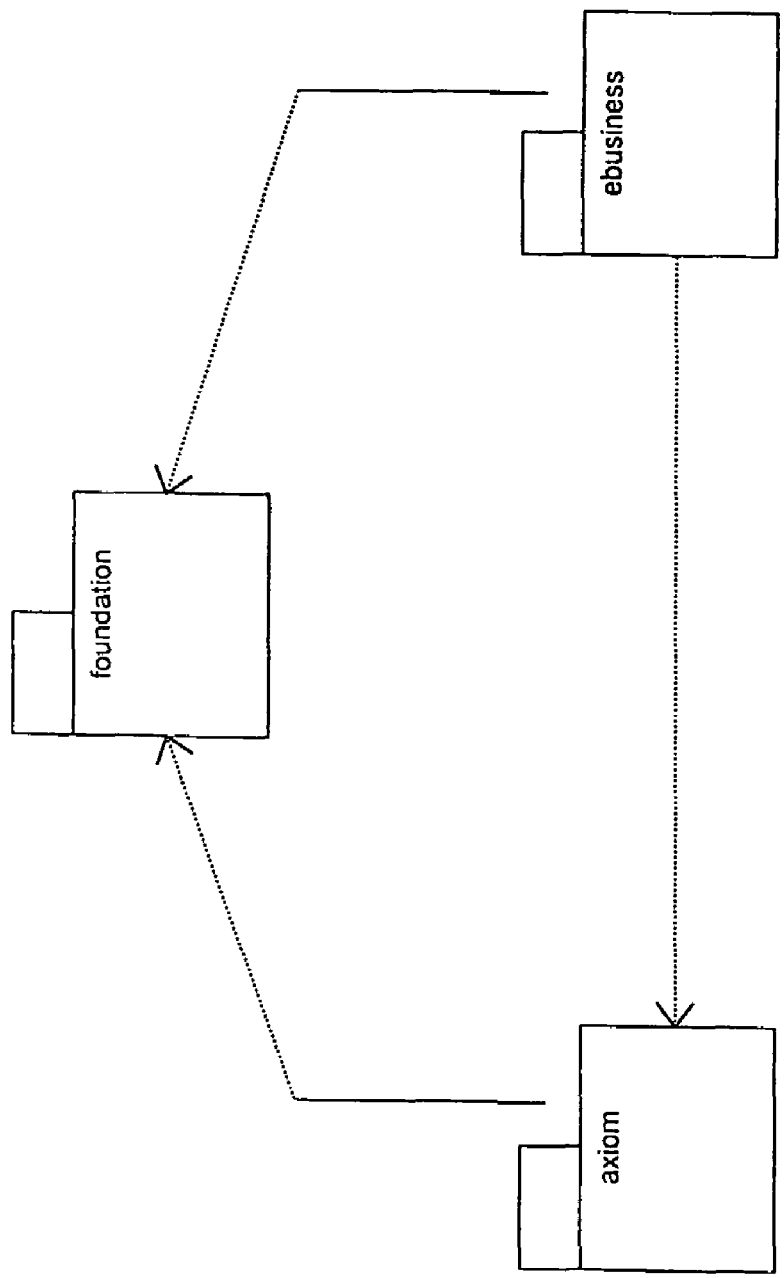
FIG. 11 is an example of packages in accordance with an embodiment of the present invention.

An aggregation is depicted in UML with a line that extends from the containing to the contained item as shown in FIG. 10. The line begins with an oblong diamond that specifies a category of containment. A hollow diamond is used to show that the object is being contained by reference. A solid diamond specifies that the object is contained by value.

In accordance with an embodiment of the present invention, it a multiplicity for the object being contained can be also specified. Options are 1 (one to one), 0..1 (optionally null for references), or 0..* (one to many). As with all other elements of the UML it is possible to stereo type the relationship can be stereotyped. Preferably, an aggregation can be named as well.

Packages are used to group classes and other packages in to a hierarchy. Each package contains classes and/or other packages. When the classes of one package "use" the classes of another, this is depicted as a dotted line with an arrow in the appropriate directions, this same "use" notation can be applied to classes as well.

Mapping UML to EJB

The Smart Generator of the present invention transforms a UML diagram into EJB components, preferably, Smart Components. The Smart Generator generates Java code, i.e., Java classes comprising one or more EJB components from specific notations in the UML diagram.

Classes

Only classes in the model that are stereotyped as eBusiness Smart Component (eBSC) will result in the generation of java classes. There is not a one to one mapping between each class in the UML model and Java. In particular, all eBSCs are implemented using the abstract factory pattern. That is, the Smart Generator generates at least one interface and two Java classes for each eBSC that is modeled in UML. In addition, for each Entity eBSC, the Smart Generator generates an associated Primary Key and Value class. The Table 1 below describes the mapping of classes based on the class stereotype.

TABLE 1

Stereotype Mappings

| Stereotype | Class Only | Interface | Home | Impl | PK | Value |
|---|---|---|---|---|---|---|
| BSC.Belonging | | ✓ | ✓ | ✓ | | |
| BSC.Session | | ✓ | ✓ | ✓ | | |
| BSCEntity | | ✓ | ✓ | ✓ | ✓ | ✓ |
| BSC.Workflow | ✓ | | | | | |
| BSC BusinessPolicy | ✓ | | | | | |

The naming convention for the generated classes is a follows:

1) Class Only: The class implements the respective interface and given the same name as the class in the component model.

2) Interface: The interface given the same name as the class in the model.

3) Home: The Home interface/class is the class name with the word Home appended (e.g., Item Home). For the Session and Entity objects, the EJB compiler uses this Home interface to generate the Home implementation.

4) Implementation: The Implementation class is the class name with the letters "Impl" appended (e.g., ItemImpl).

5) Primary Key: The Primary Key class is the class name with the letters "Pk" appended (e.g., Item Pk).

6) Value: The Value class is the class name with the letters "Value" appended (e.g., Item Value).

Each EJB component class has what is called a home interface, which defines the methods for creating, initializing, destroying, and (in the case of Entity Beans) finding EJB instances on the server. The home interface is a contract between an EJB component class and its container, which defines construction, destruction, and lookup of EJB instances.

An EJB home interface extends the interface javax.ejb.EJBHome, which defines base-level functionality for a home interface. All methods in this interface must be Java RMI-compatible (Remote Method Invocation-compatible), meaning that every method must be usable by the java.rmi package. RMI is a set of protocols developed by Sun's JavaSoft division that enables Java objects to communicate remotely with other Java objects. RMI is a relatively simple protocol, but unlike more complex protocols such as CORBA (Common Object Request Broker Architecture) and DCOM (Distributed Component Object Model), it works only with Java objects. CORBA and DCOM are designed to support objects generated in any language. The EJB home interface also defines one or more create( ) methods, whose names are all create, and whose signatures are distinct. The return value of these object create methods is the remote interface for the EJB. As stated herein, the remote interface consists of the business methods the EJB provides.

When a client wants to create a server-side Bean, it uses the JNDI to locate the home interface for the class of Bean it wants. The JNDI is a standard extension to the Java core that provides a global service to any Java environment, allowing Java programs to locate and use resources by name, to find out information about those resources, and to traverse structures of resources.

Once the client has the home interface for the EJB class it wants to create, it calls one of the create( ) methods on the home interface to create a server-side object. The client-side home interface object does a remote method call to the EJB container on the server, which then creates the EJB component and returns an EJB object to the client. The client may then call the EJB object's methods, which are forwarded to the container. The container typically defers the implementation of the method to the EJB component, although it is also responsible for detecting some error conditions (such as non-existence of the EJB component) and throwing appropriate exceptions.

Entity Beans also have additional home interface finder methods that locate individual persistent JavaBeans based on the Bean's primary key. The home interface might be used, for example, to create an instance of a ProductionFacility object, and then the finder method could be given the ProductionFacilityCode number to locate the object representing a specific facility.

Once the client has an EJB object, it can call that object's methods, which are implementations of the EJB component class's remote interface. An EJB remote interface extends the interface javax.ejb.EJBObject, and can define any method it wishes. The only restrictions are that the argument and return types for each method are RMI-compatible, and that each method must contain java.rmi.RemoteException in its throws clause. Furthermore, each method in an EJB remote interface must correspond exactly (that is, in name, argument number and type, return type, and throws clause) to a matching method in the Enterprise JavaBean component class the interface represents.

The javax.ejb.EJBObject interface defines methods that allow the client to do the following operations on an EJB object's reference: Obtain the home interface for the EJB class; remove the EJB object; obtain the EJB object's handle; and obtain the EJB object's primary key.

The container provides the implementation of the methods defined in the javax.ejb.EJBObject interface. The business methods are delegated to the enterprise Bean class.

Primary Key and Value

For Entity Components, the Smart Generator generates two special classes, Primary Key and Value. The Primary Key class is a Java class with public members for each of the attributes that are stereotyped as <<BSCPrimaryKey>>. The primary key class is used by the create ()and findByPrimaryKey methods of the generated home class to create an EJB object and to locate individual persistent EJB, respectively. The following code sample 1 illustrates one use of the Primary Key Class.

---
Code Sample: Primary Key Class
---
```
public class OrderPk extends SnartKey implements java.io.Serializable
{
public String key;
public OrderPk(
{
    super( );
}
  more stuff here
}
public interface OrderHome extends SmartEJBHome
{
    public order create (theory.smart.ebusiness.order.OrderPk orderPk)
        throws CreateException, RemoteException;
    Order findByPrimaryKey(theory.smart.ebusiness.order.OrderPk
    orderPk)
        throws RemoteException, FinderException;
}
```
---

The Value class is a Java class with public members for each of the attributes of the associated Entity. This includes attributes that are specified through aggregation. The generated Value accessor methods uses the Value class to simplify the retrieval of multiple attributes and reduce the overhead associated with remote method invocation. The following sample code describes one usage of Value objects in generated code.

---
Code Sample: Value Object
---
```
public class ItemValue extends SmartValue
{
    public String version;
    public String identifier;
    public String supplier;
    public String description;
    public theory.smart.axiom.units.Price price;
    public LinkedList qualities;
protected ItemValue( )
{
 super( );
 }
}
public interface Item extends ConfigurableEntity
{
    public ItemValue getItemByValue( ) throws ReTiDteException;
    public void setItemByValue(ItemValue value) throws RemoteException;
//...
}
```
---

Since the setByValue has no built in Entity locking mechanism, the developer/user must use caution when using the setByValue. When the setByValue is applied on an Entity object, the attributes which are members of the Primary Key cannot be updated since they are part of Entity's identity, which are immutable.

Interfaces, Homes, and Implementations

The abstract factory pattern requires that objects be accessed only through their interfaces and the classes implementing those interfaces can be acquired only through a factory class. In EJB, the factory class is referred to as a Home. The abstract factory pattern has slightly different implications for EJB components and belongings.

Figure 12:
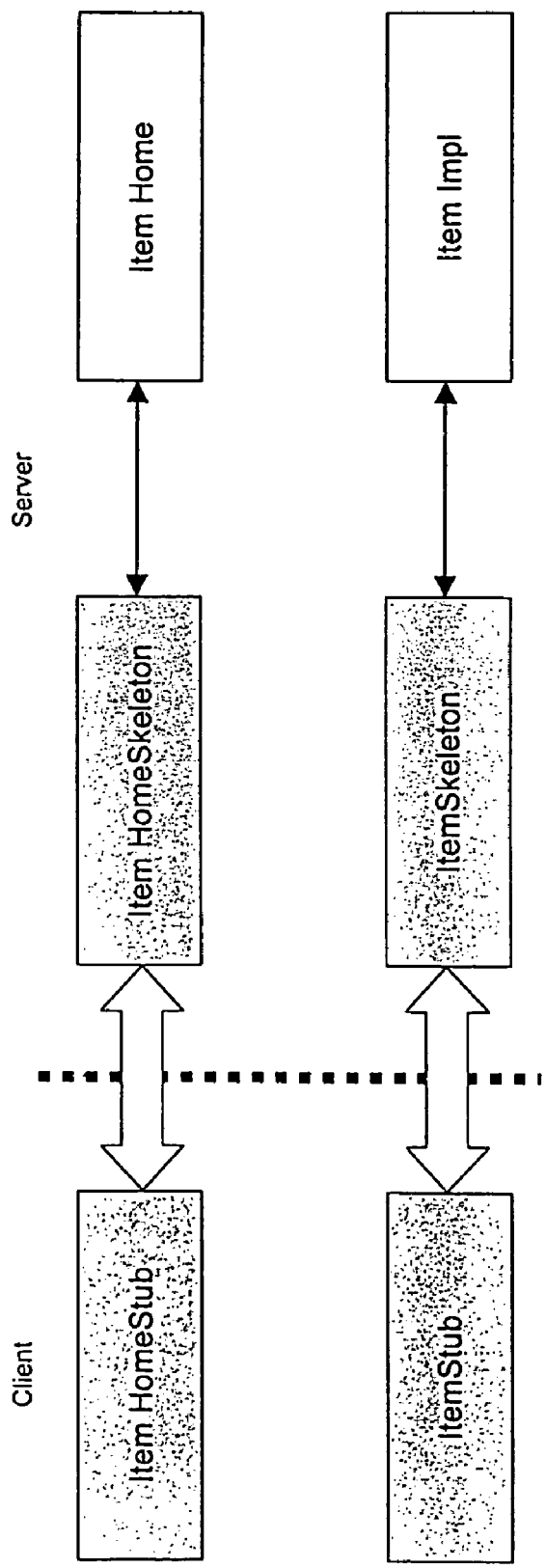
FIG. 12 is an example of proxy stubs and skeletons in accordance with an embodiment of the present invention.

Turning now to FIG. 12, the EJB compiler runs and creates the appropriate proxies stubs and skeletons for Session and Entity Objects. At deployment, the application server registers the home interface with the Java Naming and Directory Interfaced (NDI) so that EJBs users will be able to create and find them using the home interface.

For Belongings, the home, interface, and implementation reside wherever they are instantiated. Belongings are always passed by value. When a belonging is used as the parameter to a method of a Session or Entity, it is serialized and then reinstated on the server. Hence, the Java class associated with the Belonging must be available in the class path on the server. Accordingly, the release of these classes must be coordinated between the client and the server on deployment.

The finder methods reside in the home interface. A finder method is one that locates one or more preexisting entities. The Smart Generator of the present invention automatically generates a finder method based on the Primary Key, as shown in the Primary Key Class code sample described herein. The developer/user can add an operation to the main class and stereotyping it as <<BSC.Home.Operation>> to create finders that search for entities based on the values of some other attributes. The Smart Generator generates the resulting method into the associated home class.

Attributes

For each attribute that is specified in the model. The Smart Generator generates a pair of accessor methods. The get <AttributeName> method retrieves the value of the attribute from the remote object and returns it to the client. The set <AttributeName> method passes the attribute to the remote object where it is updated. In the case of an Entity, the entire object is marked as dirty to let the application server know that the changed values need to be persisted in the database. This is true of Sessions to a lesser degree in that many application servers perform a serialization of Session Beans for the purpose of optimizing the caching of Sessions. The following is a code sample of generated accessors:

---

Code Sample: Generated Accessors

---

```
public interface Item extends ConfigurableEntity
{
  public String getSupplier ( ) throws RemoteException;
  public String getIdentifier ( ) throws RemoteException;
  public String getVersion ( ) throws RemoteException;
  public String get Description ( ) throws RemoteException;
  public void setDescription(String description) throws RemoteException;
  public theory.smart.axiom.units.Price getPrice ( ) throws
  RemoteException;
  public void setPrice(theory.smart.axiom.units.Price price) throws
  RemoteException;
}
public class ItemImpl extends ConfigurableEntityImpl
{
  public String version;
  public String identifier;
  public String supplier;
  public String description;
  public theory.smart.axiom.units.Price price;
  public String getDescription ( )
  {
    return (String) description; public void
    setDescription(String description)
  }
    isDirty = true;
    this.description = (String) description;
}
public String getSupplier ( )
{
  return supplier;
}
public String getIdentifrer ( )
{
  return identifier;
}
public String getVersion ( )
{
return version;
}
public theory.smart.axiom.units.Price getPrice ( )
{
  return (theory.smart.axiom.units.Price) price. value ( );
}
public void setPrice(theory.smart.axiom.units.Price price)
{
  isDirty = true;
  this.price = (theory.smart.axiom.units.Price) price.value( );
  }
}
```

It is appreciated that in the generated accessors sample code, there are no methods for setting attributes that are stereotyped as part of the Primary Key for an Entity. This is because the Primary Key attributes are part of the identity of the object and as such they are immutable, cannot be changed. Accessors are also generated for belongings. A direct call to the implementation object is a call to an accessor of Belonging. It is appreciated that all of the attributes must be serializable to ensure that they can be persisted.

Aggregation

Aggregation allows for the definition of an attribute of a class by drawing a line between it and another class to include it as a member. The following rules describe the allowable notations:

1) A Belonging may only be contained by value (solid diamond) as shown in FIG. 10.

2) An Entity may only be contained by reference (hollow diamond). In such cases the attribute is stored as a SmartHandle.

3) A Workflow is similar to a belonging and is always contained by value. A workflow is persisted using a WorkflowContext.

4) A BusinessPolicy is similar to a belonging and is always contained by value. The accessors for the BusinessPolicy should explicitly specified as business methods.

5) If an aggregation is named, that name will be used when generating the accessors for that attribute. This is necessary so that multiple relationships to the same class can be modeled.

6) If an aggregation is not named, the accessors will be generated based on the name of the class that is being contained 7) Multiplicity may be defined as described in the section on Collections and Iterators.

Collections and Iterators

One of the most challenging issues when designing distributed object systems is implementing one to many relationships between objects. When modeling Smart Components in UML, such relationships are described by stereotyping either an attribute or an aggregation with a multiplicity of zero or more. The collection mechanisms can be based on the Java 1.2 collection API. When an aggregation relationship is stereotyped as a particular collection type, the internal attribute reflects that choice and the appropriate accessors are generated by the Smart Generator. As an example, the Table 12 describes the options, a brief description of their usage, and the JDK (Java Development Kit) 1.2 class upon which their implementation is based type.

TABLE 2

Collection Stereotype Mappings

| | | |
|---|---|---|
| BSC.Collection.Set | A collection that contains no duplicates in which there is no implied ordering. | java.util.Collection.TreeSet |
| BSC.Collection.Array | An ordered collection that is stored as contiguous elements. This allows for optimal random access so that operations like re-sorting can be executed quickly. | java.util.Collection.ArrayList |

TABLE 2-continued

Collection Stereotype Mappings

| | | |
|---|---|---|
| BSC.Collection.List | An ordered list that optimizes insertions at the ends. | java.util.Collection.LinkedList |
| BSC.Collection.Map | A collection that is indexed by string and optimized for quick lookup. Iteration will be in ascending order according to the natural sort method. | java.util.Collecion.TreeMap |

The Smart Generator generates the accessors for collections for each stereotype, as described in Table 3. The Table 3 uses a short hand syntax to convey which accessors are generated when a given stereotype is chosen. The token <Attribute> is replaced by the name of the attribute or aggregation as specified in the model. For methods that accept or return a collection, the type is stereotype specific as defined in Table 2. It is appreciated that the details of the parameters and return values are implied. While there is no true inheritance relationship, it "Set" serves as a basis for "Array", which is a basis for "List". It is appreciated that the "Map" is different in that it supports lookup by key.

In accordance with an embodiment of the present invention, all collections support the use of RemoteIterators. A RemoteIterator is stored on the server and is used to selectively retrieve the members of a collection. Their use requires overhead, and accordingly, RemoteIterators should be used only when necessary and appropriate. For example, when the contents of the collection are large and the client wishes to retrieve only a subset of the collection at a time.

Where an aggregation to an entity is specified by value, the Smart Generator generates an additional group of methods. These methods simplify the maintenance of the ownership relationship by ensuring that the underlying Entity is removed from it's home in conjunction with the removal of its reference from the List. It is appreciated that the converse, add by value, is not supported because it would require that the containing entity be aware of the home of the entity to be added.

The "Set" provides methods for adding and removing attributes from a collection, it provides a "bag" type collection mechanism. The "Array" provides random access methods and is optimized for random access by integral position, for this reason it is especially useful when multiple sort orders are required. The "List" provides random access but is optimized for adding at the ends. Accordingly, the "List" is very useful when stacks or queues are called for. The "Map" makes it possible to index a collection by a "String".

TABLE 3

Generated Accessors by Stereotype

| | Accessors | Iterator Methods | Entity by Value |
|---|---|---|---|
| Set | add<Attribute><br>add<Attributes>(<CollectionType>)<br>contains<Attribute><br>is<Attributes>Empty<br>removeAll<Attributes><br>get<Attributes>( ):<CollectionType> | create<Attribute>Iterator<br>hasNext<Attribute><br>getNext<Attribute><br>remove<Attribute>At | Remove<Attribute><br>ByValue<br>Remove<Attributes><br>ByValueAt<br>RemoveAll<Attribute><br>ByValue |
| Array | <All of set> +<br>add<Attribute>(int position, . . . )<br>set<Attribute>(int position, . . . )<br>get<Attribute>(int position)<br>get<Attributes>(int from, int to)<br>remove<Attribute>(int position)<br>indexOf<Attribute><br>lastIndexOf<Attribute> | <All of Set> +<br>add<Attribute>At<br>set<Attribute>At<br>getNext<Attribute><br>getPrevious<Attribute><br>getNext<Attribute>Index<br>getPrevious<Attribute>Index | <All of Set> +<br>remove<Attribute><br>ByValue(int) |
| List | <All of Array> +<br>addFirst<Attribute><br>addLast<Attribute><br>getFirst<Attribute><br>getLast<Attribute><br>removeFirst<Attribute><br>removeLast<Attribute> | <All of Array> | <All of Array><br>removeFirst<Attribute><br>By Value<br>RemoveLast<Attribute><br>ByValue |
| Map | put<Attribute>(String key)<br>put<Attributes>(TreeMap)<br>get<Attribute>ByKey<br>get<Attributes>(String)<br>contains<Attribute>Key<br>contains<Attribute>Value<br>remove<Attribute>ByKey<br>removeAll<Attributes> | create<Attribute>Iterator<br>hasNext<Attribute><br>getNext<Attribute><br>remove<Attribute>At | <Accessors are defined using WithKey instead of ByKey><br>put<Attribute><br>ByValue<br>Remove<Attribute><br>ByValueWithKey<br>RemoveAll<Attributes><br>ByValue |

Design Decisions

While it would be nice to allow the modeler to design without consideration for implementation details, the reality is that truly good designs take into account deployment time issues.

One of the most common issues when modeling EJB is related to legacy systems. These systems very typically provide an API or message-based protocol to allow external systems to access their functionality. The tendency in such cases is to simply model access to such systems as a Session component where each function in the API is a method of the Session Bean. This technique is not advisable for legacy systems that store complex business data and relationships. The better approach is to model the internal objects as Entities where appropriate using the present invention. Thereby providing a more understandable system definition that takes advantage of the important caching and transaction services features of the EJB specification.

In general, Session Beans provide a sensible mechanism for implementing "workflow" related business logic. As used herein, workflow is logic that coordinates the usage of any number of Entity Beans. This has the performance-improving effect of reducing the network overhead associated with executing extended operations remotely. Where an Entity Bean needs to perform complex business logic on classes that it references, it is best to implement that logic as a method of the Entity bean. This places the business logic where it belongs, with the data that it is manipulating.

There is a strong trend in the industry to translate message specifications, particularly XML DTDs (document type definition), directly into business objects. While this maybe convenient, it does not result in a clean description of the business objects. This is like modeling a system based solely on the API. A better approach is to consider a message specification as providing insight into a single users perspective of the system. One approach is to consider the messages as method invocations to one or more underlying business objects. The contents of the message can then be modeled using the present invention as attributes of various underlying objects.

In accordance with an embodiment of the present invention, the Smart Generator utilizes a Code Template Dictionary to generate the Java source code. The Smart Generator uses the CTD to lookup code templates from a dictionary containing key-value pair information. That is, the Smart Generator uses Smart Key to lookup its corresponding value in the CTD. The values of CTD are the Code Templates, templates for generating code. Developers can edit the CTD Text Files. A CTD Text File is the text representation of the CTD. A CTD Object reads each CTD Text File. A CTD Object is the runtime object representation of a CTD Text File such that developers can build tools to access the dictionary. Since the CTD Objects are sometimes shipped with a code generator to a customer, the CTD Object contents are encrypted to prevent reverse engineering of the Code Templates.

The CodeTemplateDictionary java class reads in a .ctd (CodeTemplateDictionary) file and puts it into a dictionary. The Smart Generator uses the lookup() method to lookup the value of a key. Preferably, Code Template Dictionary encodes each key/value pair entry.

The following is an example of a format for the .ctd file:

```
$KeyName$_Begin    ;; Note this must start from column zero
    code...
```

-continued

```
    code...
    code...
$KeyName$_End    ;; Note this must start from column zero
```

It is appreciated that anything that is outside of $KeyName$_Begin and $KeyName$_End in the .ctd file is treated as comments by the Smart Generator. At runtime, the Smart Generator uses the CTD Objects to access the dictionary to lookup the code templates, e.g., CodeTemplateDictionary ctd=new CodeTemplateDictionary ("ScreenDotJava.ctd");
CodeTemplateString classHeaderTemplate=ctd.lookup ("ClassHeader").

Following is an example of the Smart Keys or Primary Keys of the present invention:

```
$ClassHeader$_Begin
import helloworld;
import theory.smart.*;
$ClassHeader$_End
$ClassConstructor$_Begin
public Customer()
{
super();
}
$ClassConstructor $_End
```

Implement a code generator using Code Template Dictionary (CTD) technology. Smart Generator goes through a bootstrap stage where it collects and encrypts all the CTD and produces a SmartGenerator.ROM file. It is appreciated that the dictionary allows for ease of maintenance for Code Templates, and the SmartGenerator.ROM enables easy packaging for the Smart Generator that uses the templates.

In accordance with an embodiment of the present invention, the developer/user can generate Java codes using the Smart Generator along with the CTD in the following manner:

1) Edits the CTD Text Files;
2) Bootstraps SmartGenerator to read in all the CTD Text Files and generate SmartGenerator.ROM;
  i Reads each CTD Text File
  ii. Turns each CTD Text File into CTD Object
  iii. Stores CTD Objects into Smart Objects
  iv. Serializes Smart Objects into SmartGenerator.ROM
3) Run Smart Generator The operation of the Smart Generator is described using a simple hypothetical example wherein "HumanBeans" goes on "ShoppingTrips" to collect "BeanieToys". On a typical ShoppingTrip, three HumanBeans named JoeBean, MaryBean, and EthylBean buy some BeanieToys. JoeBean buys three BeanBags, two BeanieBabies, and a JellyBean. MaryBean bean buys one GreenBean and five CoffeeBeans. EthylBean buys two BeanBags, and one BeanieHat. The next day, the three friends go on another ShoppingTrip and add more BeanieToys to their collection. This process (i.e., business process) can be modeled using the Smart Generator of the present invention. The first step is to analyze the various characters (or elements) within the business process.

BeanieToys are collected and counted by HumanBeans. HumanBeans only care about the name of the BeanieToy (JellyBean, BeanBag, CoffeeBean, etc), and how many are owned.

HumanBeans are identified by their name (JoeBean, MaryBean, EthylBean). HumanBeans remember their collection of BeanieToys from day to day and add to it on Shopping Trip.

ShoppingTrips are where HumanBeans gather to buy Beanie Toys. The only way a HumanBean can buy a Beanie Toy is through a ShoppingTrip. Although Shopping Trips may be repeated from day to day, nothing about a prior Shopping Trip influences the next Shopping Trip.

Figure 13:
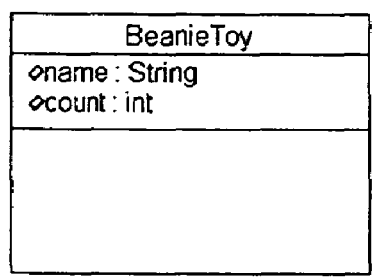
FIG. 13 is an UML diagram of a BeanieToy Class in accordance with an embodiment of the present invention.

Since BeanieToys, HumanBeans, and ShoppingTrips have distinct characteristics and activities, the developer/user can model each of them as a class using the UML model of the present invention. The class description of a BeanieToy in UML can be modeled with two attributes, name and count, as shown in FIG. 13. Since BeanieToys perform no activities, it has no methods.

Figure 14:
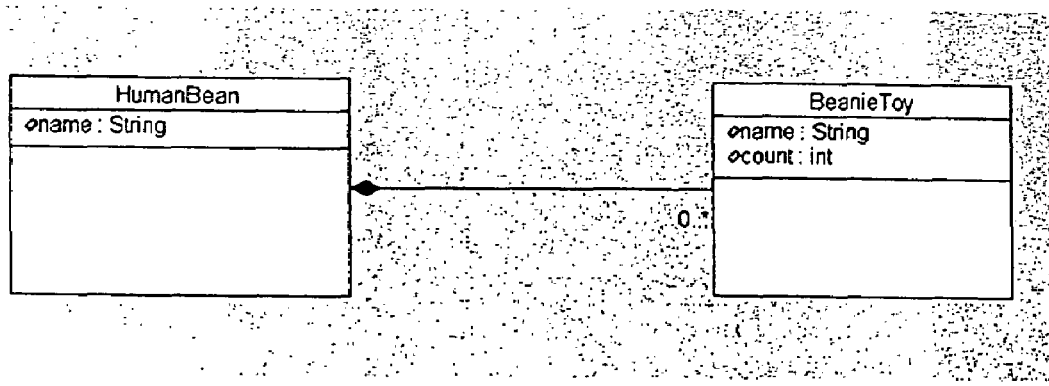
FIG. 14 is an UML diagram of a HumanBean Class in accordance with an embodiment of the present invention.
Figure 15:
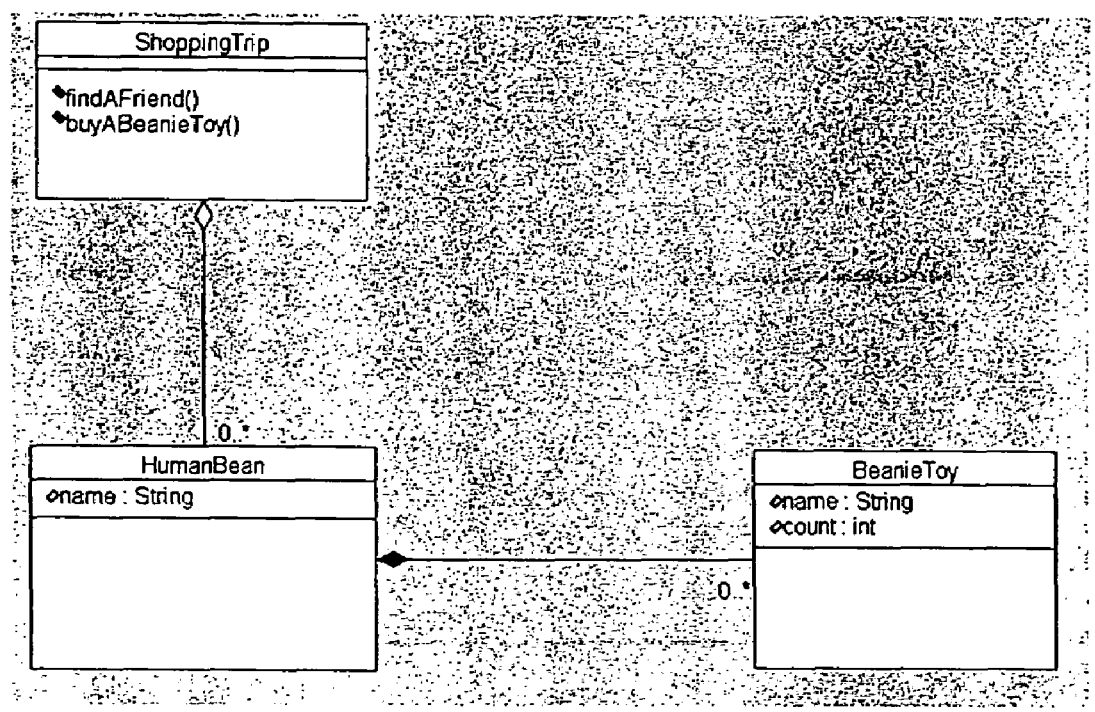
FIG. 15 is an UML diagram of a ShoppingTrip Class in accordance with an embodiment of the present invention.

The class description of a HumanBean in UML can be modeled with two attributes, name and an aggregation of many BeanieToys. As shown in FIG. 14, the "by value" relationship is indicated by the solid diamond on the aggregation line. The class description of the ShoppingTrip in UML can be modeled with one attribute, an aggregation of many HumanBeans, as shown in FIG. 15. The ShoppingTrip also has two methods, "void findAFriend (String humanBeanName)" and "void buyABeanieToy (String humanBeanName, String toyName)". These methods can be used to collect HumanBeans on a ShoppingTrip, and allow the HumanBeans to buy BeanieToys. Since the HumanBeans exist outside the context of the shopping trip, the "by reference" relationship is indicated the a hollow diamond in FIG. 15.

Since BeanieToys belong to HumanBeans and persist as long as the owner, HumanBean, persists, they can be characterized or stereotyped as Belongings. That is, BeanieToy has no activity outside the context of its HumanBean. A Belonging is a lightweight, local variable that can be serialized and it belongs to another objects such as an Entity or Session, and may be persisted with the class to which it belongs. Whereas, the HumanBeans persist from day to day and distinguished by their name. HumanBeans possess no sophisticated logic and must be on a ShoppingTrip to fulfill their mission, to buy BeanieToys, hence can be characterized or stereotyped as Entities. An Entity's key aspect is persistence. It does not implement complex business logic, but rather represent a unique instance of attributes and other data.

Figure 16:
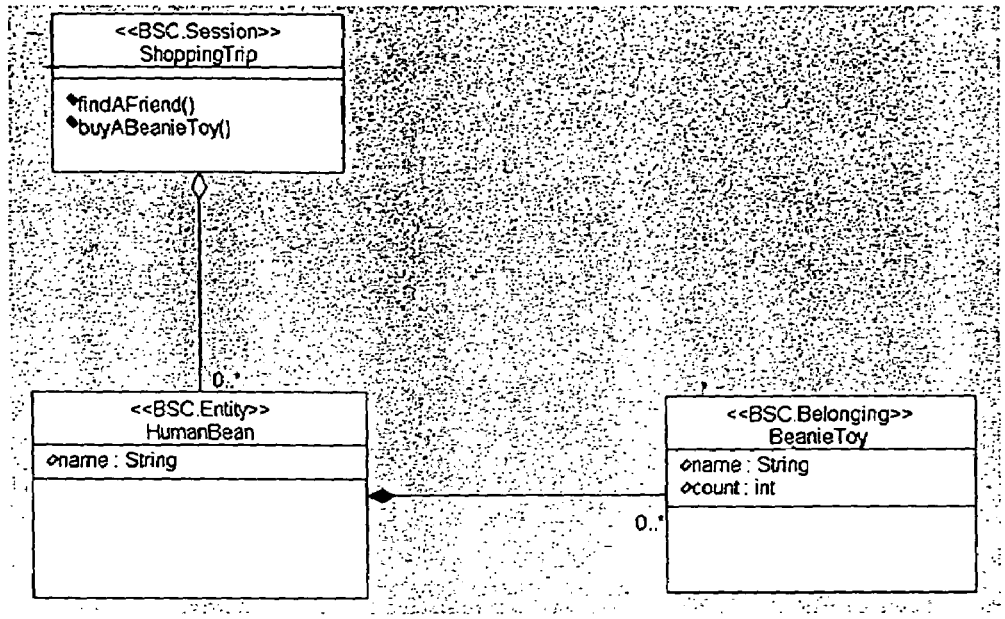
FIG. 16 is an UML diagram of the BeanieToy, HumanBean and ShoppingTrip Classes after the application of eBSC stereotypes in accordance with an embodiment of the present invention.

ShoppingTrips have no identifying attributes. They possess services to aggregate HumanBeans and allow them to buy BeanieToys. The emphasis of the ShoppingTrip is the services it provides, to collect HumanBeans and enable them to buy BeanieToys. Accordingly, ShoppingTrips can be characterized or stereotyped as Sessions. A session component models a service object. The business methods are the most important aspect of the Session, because they allow access to the services provided by the Session. FIG. 16 illustrates the UML diagram of the three class after eBSC stereotypes have been applied to them.

Figure 17:
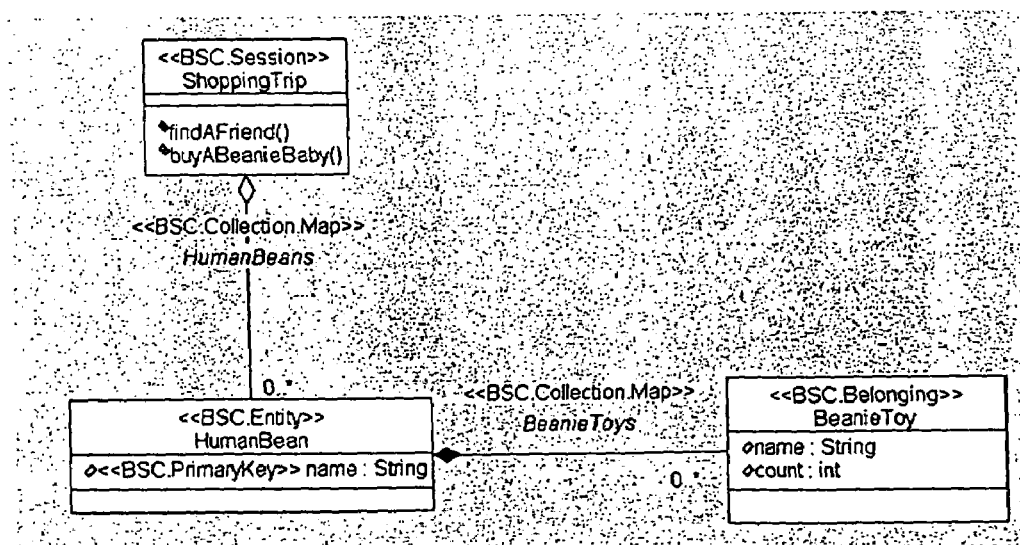
FIG. 17 is an example of the final UML diagram of the BeanieToy, HumanBean and ShoppingTrip Classes in accordance with an embodiment of the present invention.

The Enterprise JavaBeans specification requires that for each Entity, there must be a class that represents the attributes of the Primary Key of that class, i.e., Entity Primary Key. Since the name of each HumanBean is its identifier, the component development process applies the BSC.PrimaryKey stereotype on the name attribute of HumanBean. Also, the components development process allows several ways to characterize aggregation or containment: List, Array, Map, and Set. The BSC.Map stereotype defines Map containment, wherein the contained object is accessed via a key. Accordingly, the present invention characterizes both aggregations using the BSG.Map stereotype, as shown in FIG. 17. A name for each aggregation can be also provided.

In accordance with an embodiment of the present invention, the developer/user can generate Java source code using the Smart Generator in the following manner:

1. Create a new package called examples.umlebsc in the Smart Rational Rose model, smart.mdl.

2. Add the ShoppingTrip, BeanieToy, and HumanBean classes to the examples.umlebsc package, to resemble the UML diagram in FIG. 17.

3. Export the model from Rational Rose using the plugin. Use the Smart Generator to generate source code for the three new classes.

4. The Smart Generator creates the following files and Java source codes:

| Class | File | Use in Sun's EJB Specification | Description |
| --- | --- | --- | --- |
| BeanieToy | BeanieToy.java | n/a | Local, serializable interface that specifies the Beanie Toy class. |
| | BeameToyHome.java | n/a | Factory for instantiating Beanie Toys |
| | BeanieToyIMpl.java | n/a | Implementation of the Beanie Toy interface. This implementation is used by the Beanie ToyHome factory to create Beanie Toys. |
| HumanBean | HumanBean.java | Remote Interface | Specification of HumanBean class. |
| | HumanBeanlHome.java | Home Interface | Factory for instantiating and managing the life-cycle of HumanBeans. |
| | HumanBeanImpl.java | Bean Class | Server-side implementation of a HumanBean |
| | HumanBeanPk.java | Primary Key | Unique key for locating an instance of a HumanBean. |
| | HumanBeanValue.java | n/a | Convenience class with top-level attributes of a HumanBean |

| Class | File | Use in Sun's EJB Specification | Description |
|---|---|---|---|
| ShoppingTrip | ShoppingTrip.java | Remote Interface | Specification of Shopping TripClass |
| | Shopping TripHome.java | Home Interface | Factory for instantiating and managing the life-cycle of HumanBeans. |
| | Shopping TripImpl.java | Bean Class | Server-side implementation of a Shopping Trip. |

BeanieToy.java file:
public interface BeanieToy extends Belonging

```
{
    public String getName ( );
    public void setName (String name);
    public int getCount( );
    public void setCount (int count);
}
```

It is appreciated that the Belonging interface requires that all subclasses implement the java.util.Comparable interface and implement java.io.Serializable.

BeanieToyImpl.java file:
public class BeanieToyImpl extends BelongingImpl implements BeanieToy

```
{
    public String name;
    public int count;
    protected BeanieToyImpl ( )
    {
        super ( );
        name = "";
        count = ( );
    }
    public String getName ( )
    {
        return (String) name;
    }
    public void setName(String name)
    {
        isDirty = true;
        this.name = (String) name;
    }
    public int getCount ( )
    {
        return (int) count;
    }
    public void setCount(int count)
    {
        isDirty = true;
        this.count = (int) count;
    }
    public Belonging value ( )
    {
        xamples. umlebsc.BeanieToy aCopy = examples. umlebsc
            BeanieToyHome.
    create ( );
        aCopy.setName(name);
        aCopy.setCount(count);
```

```
        return aCopy;
    }
    public int compareTo(Object o)
    {
        int result = 0;
        if (o instanceof BeanieToy == false)
        {
            throw new ClassCastException( );
        }
        BeanieToy target = (BeanieToy) o;
        result = this.name.compareTo(target.getName( ));
        if (result == 0)
        {
        }
        result = (this.count == target.getCount ( ))
            ? 0 : (this.count < target. get Count( )) ? −1 : 1;
    }
    return result;
}
```

BeanieToyHome.java file:

public class BeanieToyHome implements SmartHome,java io.Serializable

```
{
    public static BeanieToy create ( )
    {
        return new BeanieToyImpl ( );
    }
}
```

It is appreciated that the single create( ) method instantiates a new BeanieToyImpl( ) and returns it as the BeanieToy interface.

HumanBean.java file:
public interface HumanBean extends Entity

```
}
    public HumanBeanValue getHumanBeanByValue ( ) throws RemoteException;
    public void setHumanBeanByValue(HumanBeanValue value) throws RemoteException;
    public String getName( ) throws RemoteException;
    public RemoteIterator createBeanieToysIterator( ) throws RemoteExeption;
    public void removeBeanieToysAt(RemoteIterator rit) throws RemoteException;
    public boolean containsBeanieToysKey (String key) throws RemoteException;
    public boolean containsBeanieToysValue (examples.umlebsc.BeanieToy BeanieToys) throws
RemoteException;
    public examples.umlebsc.BeanieToy getBeanieToysByKey (String key) throws RemoteExceptio
    public TreeMap getBeanieToyses ( ) throwsRemoteException;
    public examples.umlebsc.BeanieToy getNextBeanieToys(RemoteIterator rit) throws
RemoteException;
    public int getNumberofBeanieToyses ( ) throws RemoteException;
    public boolean hasNextBeanieToys (RemoteIterator rit) throws RemoteException;
    public boolean isBeanieToysesEmpty( ) throws RemoteException;
    public void putBeanieToys(String key, examples. umlebsc.BeanieToy BeanieToys) throws
RemoteException;
    public void putBeanieToyses(TreeMap BeanieToyses) throws RemoteException;
    public void removeAllBeanieToyses ( ) throws RemoteException;
    public examples. umlebsc.BeanieToy removeBeanieToysByKey (String key) throws RemoteExce
}
```

HumanBean.Impl.java file:
public class HumanBeanImpl extends EntityImpl

```
}
    public String name;
    public TreeMap BeanieToyses;
    private TreeMap BeanieToysIterators = new TreeMap(SmartComparator.getInstance( ));
    public HumanBeanImpl ( ) throws CreateException
    {
        super ( );
    }
    public HumanBeanValue getHumanBeanByValue( ) throws RemoteException
    {
        HumanBeanValue value = new HumanBeanValue( );
        value.name = name;
        value.BeanieToyses = get BeanieToyses( );
        return value;
    }
    public void setHumanBeanByValue(HumanBeanValue value) throws RemoteException
    {
```

```
removeAllBeanieToyses();
putBeanieToyses(value.BeanieToyses);
}
public void ejbCreate(examples.umlebsc.HumaiBeanPk
    humanBeanPk) throws CreateException
{
super.ejbCreate((SmartKey) humanVeanPk);
name=humanBeanPk.name;
BeanieToyses=new TreeMap(SmartComparator.getInstance
    ());
}
public void ejbPostCreate(examples.umlebsc XUman-
    BeanPk humanBeanPk) throws CreateExcep
{
super.ejbPostCreate((SmartKey) humanBeanPk);
}
public void ejbLoad() throws java.rmi.RemoteException
{
super.ejbLoad();
}
public void ejbStore() throws java.rmi.RemoteException
{
super.ejbStore();
}
public void ejbRemove() throws java.rmi.RemoteException,
    javax.ejb.RemoveException
{
super.ejbRemove();
}
public void ejbActivate() throws java.rmi.RemoteException
{
super.ejbActivate();
}
public void ejbPassivate() throws java.rmi.RemoteException
{
super.ejbPassivate();
}
public void setentityContext(EntityContext ctx) throws jav-
    a.rmi.RemoteException
```

```java
{
super. setEntityContext(ctx);
}
public void unsetEntityContext() throws java.rmi.RemoteException
{
super.unsetEntityContext();
}
public String getName()
{
return name;
}
public boolean containsBeanieToysKey(String key)
{
return BeanieToyses.containsKey(key);
}
public boolean containsBeanieToysValue(examples.umlebsc.BeanieToy BeanieToys)
{
return BeanieToyses.containsValue(BeanieToys);
}
public RemoteIterator createBeanieToysIterator()
{
Iterator it=BeanieToyses.values().iterator();
RemoteIterator rit=new RemoteIterator(it);
BeanieToysIterators.put(rit,it);
return rit;
}
public examples.umlebsc.BeanieToy getBeanieToysByKey(String key)
{
return (examples.umlebsc.BeanieToy) BeanieToyses.get(key);
}
public TreeMap getBeanieToyses()
{
TreeMap map=new TreeMap(SmartComparator.getInstance());
map.putAll(BeanieToyses);
return map;
}
public examples.umlebsc.BeanieToy getNextBeanieToys(RemoteIterator rit)
{
Iterator it=(Iterator) BeanieToysIterators.get(rit);
return (examples.umlebsc.BeanieToy) it.next();
}
public int getNumberOfBeanieToyses()
{
return BeanieToyses.size();
}
public boolean hasNextBeanieToys(RemoteIterator rit)
{
Iterator it=(Iterator) BeanieToysIterators.get(rit);
return it.hasNext();
}
pulbic boolean isBeanieToysesEmpty()
{
return BeanieToyses.isEmpty();
}
public void putBeanieToys(String key, examples.umlebsc.BeanieToy BeanieToys)
{
isDirty=true;
BeanieToyses.put(key, BeanieToys);
}
public void putBeanieToyses(TreeMap BeanieToyses)
{
this.BeanieToyses.putAll(BeanieToyses);
isDirty=true;
}
public-void removeAllBeanieToyses()
{
isDirty=true;
BeanieToyses.clear();
}
public void removeBeanieToysAt(RemoteIterator rit)
{
isDirty=true;
Iterator it=(Iterator) BeanieToysIterators.get(rit);
it.remove();
}
public examples.umlebsc.BeanieToy removeBeanieToysByKey(String key)
{
isDirty=true;
return (examples.umlebsc.BeanieToy) BeanieToys.remove(key);
}
```

HumanBeanHome.java file:

```java
public iterface HumanBeanHome extends SmartEJBHome
{
    public HumanBean create(examples.umlebsc.HumanBeanPk humanBeanPk) throws CreateExcept RemoteException;
    HumanBean findByPrimaryKey (examples.umlebsc.HumanBeanPk humanBeanPk) throws Remote Exception, FinderException;
}
```

HumanBeanPk.java file:

public class HumanBeanPk extends theory.smart.foundation.SmartKey implements java.io.Serializable

```java
{
    public String name;
    public HumanBeanPk ( )
    {
        super ( );
    }
    public HumanBeanPk (String name)
    {
        super ( );
        this.name = name;
    }
    public int compareTo (object o)
    {
        if (o instanceof HunanBeanPk == false)
        {
            throw new ClassCastException ( );
        }
        int result = 0;
        HumanBeanPk target = (HumanBeanPk) o;
        result = this.name.compareTo(target.name);
        return result;
    }
    public String toString ( )
    {
        return " " + name;
    }
```

HumanBeanValue.java file:
public class HumanBeanValue extends SmartValue

```
{
    public String name;
    public TreeMap BeanieToyses;
    protected HumanBeanValue( )
    {
    }
}
```

ShoppingTrip.java file:
public interface ShoppingTrip extends Session
{
  public boolean containsHumanBeansKey(String key) throws RemoteException;
  public boolean containsHumanBeansValue(examples.umlebsc.HumanBean HumanBeans) throws RemoteException;
  public RemoteIterator createHumanBeansIterator() throws RemoteException;
  public examples.umlebsc.HumanBean getHumanBeansByKey(String key) throws Remote Exception;
  public TreeMap getHuman Beanses() throws RemoteException;
  public examples.umlebsc.HumanBean getHuman Beans (RemoteIterator rit) throws RemoteException;
  public int getNumberOfHumanBeanses() throws RemoteException;
  public boolean hasNextHumanBeans(RemoteIteraor rit) throws RemoteException;
  public boolean isHumanBeansesEmpty() throws RemoteException;
  public void putHumanBeans(String key, examples.umlebsc.HumanBean HumanBeans) throws RemoteException;
  public void putHumanBeanses(TreeMap HumanBeanses) throws Remote Exception;
  public void removeAllHumanBeanses() throws RemoteException;
  public void removeHumanBeansAt (RemoteIterator rit) throws RemoteException;
  public examples.umlebsc.HumanBean removeHumanBeansByKey(String key) throws RemoteException;
  public void findAFriend(String humanBeanName, argname) throws Remote Exception
  public void buyABeanieToy (String humanBeanName, String toyName) throws RemoteException
}

ShoppingTripImpl.java file:
public class ShoppingTripImpl extends SessionImpl

```
{
    public TreeMap HumanBeanses;
    private TreeMap HumanBeansIterators = new TreeMap(SmartComparator.getInstance ( ));
    public ShoppingTripImpl( ) throws CreateException
    {
        super( );
    }
    public void ejbCreate( ) throws CreateException
    {
        super.ejbCreate( );
        HumanBeanses = new TreeMap(SmartComparator.getInstance( ));
    }
    public void ejbPostCreate( ) throws CreateException
    {
        super.ejbPostCreate( );
    }
    public void ejbActivate( ) throws java.rmi.RemoteException
    {
        super.ejbActivate( );
    }
    public void ejbPassivate( ) throws java.rmi.RemoteException
    {
        super.ejbPassivate( );
    }
    public void ejbRemove( ) throws java.rmi.RemoteException
    {
        super.ejbRemove( );
    }
    public void setSessionContext(SessionContext ctx) throws java.rmi.RemoteException
    {
        super.setSessionContext(ctx);
    }
    public boolean containsHumanBeansKey(String key)
    {
        return HumanBeanses.containsKey(key);
    }
    public boolean containsHumanBeansValue(examples.umlebsc.HumanBean HumanBeans)
    {
        try
        {
            return HumanBeanses.containsValue(new SmartHandle(HumanBeans));
        }
        catch (Exception e)
        {
            return false;
```

-continued

```
        }
    }
    public RemoteIterator createHumanBeansIterator( )
    {
        Iterator it = HumanBeanses.values( ).iterator( );
        RemoteIterator rit = new RemoteIterator(it);
        HumanBeansIterators.put(rit, it);
        return rit;
    }
    public examples.umlebsc.HumanBean getHumanBeansByKey(String key) throws
java.rmi.RemoteException
    {
        SmartHandle sh = (SmartHandle) HumanBeanses.get(key);
        if (sh == null)
        {
            return null;
        }
        else
        {
            return (examples.umlebsc.HumanBean) sh.getHandle( ).getEJBObject( );
        }
    }
    public TreeMap getHumanBeanses( )
    {
        TreeMap map = new TreeMap(SmartComparator.getInstance( ));
        map.putAll(HumanBeanses);
        return map;
    }
    public examples.umlebsc.HumanBean getNextHumanBeans(RemoteIterator rit) throws
java.rmi.RemoteException
    {
        ListIterator it = (ListIterator) HumanBeansIterators.get(rit);
        SmartHandle sh = (SmartHandle) it.next( );
        return (examples.umlebsc.HumanBean) sh.getHandle( ).getEJBObject( );
    }
    public int getNumberOfHumanBeanses( )
    {
        return HumanBeanses.size( );
    }
    public boolean hasNextHumanBeans(RemoteIterator rit)
    {
        Iterator it = (Iterator) HumanBeansIterators.get(rit);
        return it.hasNext( );
    }
    public boolean isHumanBeansesEmpty( )
    {
        return HumanBeanses.isEmpty( );
    }
    public void putHumanBeans(String key, examples.umlebsc.HumanBean HumanBeans)
throws java.rmi.RemoteException
    {
        isDirty = true;
        HumanBeanses.put(key, new SmartHandle(HumanBeans));
    }
    public void putHumanBeanses(TreeMap HunanBeanses)
    {
        this.HumanBeanses.putAll(HumanBeanses);
        isDirty = true;
    }
    public void removeAllHumanBeanses( )
    {
        if (HumanBeanses.size( ) > 0)
        {
            isDirty = true;
            HumanBeanses.clear( );
        }
    }
    public void removeHumanBeansAt(RemoteIterator rit)
    {
        isDirty = true;
        Iterator it = (Iterator) HumanBeansIterators.get(rit);
        it.remove( );
    }
    public examples.umlebsc.HumanBean removeHumanBeansByKey(String key) throws
java.rmi.RemoteException
    {
        isDirty = true;
        SmartHandle sh = (SmartHandle) HumanBeanses.remove(key);
        if (sh == null)
```

```
        {
            return null;
        }
        return (examples.umlebsc.HumanBean) sh.getHandle( ) .getEJBObject( );
    }
    public void findAFriend(String humanBeanName, argname) throws
java.rmi.RemoteException
    {
        return ;
    }
    public void buyABeanieToy(String humanBeanName, String toyName) throws
java.rmi.RemoteException
    {
        return ;
    }
```

While the present invention has been particularly described with respect to the illustrated embodiment, it will be appreciated that various alterations, modifications and adaptations may be made based on the present disclosure, and are intended to be within the scope of the present invention. It is intended that the appended claims be interpreted as including the embodiments discussed above, those various alternatives, which have been described, and all equivalents thereto.

What is claimed:

1. A method of generating code for Enterprise JavaBean (EJB) components from a business process, comprising the steps of:
   graphically modeling said business process using a UML drawing tool to provide an UML model having a plurality of EJB Classes;
   defining relationships between said plurality of EJB classes;
   stereotyping each of said plurality of EJB classes into one or more EJB components;
   transforming each of said EJB components into EJB source code; and
   embedding code markers in said EJB source code to enable subsequent updates to said EJB source code.

2. The method of claim 1, further comprising the step of compiling said EJB source code to generate EJB application in accordance with deployment properties.

3. The method of claim 2, further comprising the step of deploying said EJB application to a server using one of the following; bean managed persistence or container managed persistence.

4. The method of claim 1, wherein the step of stereotyping stereotypes an EJB class into at least one of the following Smart EJB component: Belonging, Session, Entity, Configurable Entity, Business Policy and Workflow.

5. The method of claim 4, wherein an Entity EJB component comprises at least one interface and two EJB classes.

6. The method of claim 5, wherein said Entity EJB component being associated with a Primary Key class and a Value class.

7. The method of claim 1, wherein each EJB component includes at least one of the following: name, stereotype, attribute and method.

8. The method of claim 7, wherein each attribute includes a pair of accessor methods.

9. The method of claim 1, wherein said relationships includes at least one of the following: inheritance and aggregation.

10. The method of claim 9, wherein said aggregation includes multiplicity.

11. The method of claim 10, further comprising the steps of:
   determining if said multiplicity relationship is one to many; and
   stereotyping said aggregation relationship into a collection type if it is determined that said multiplicity relationship is one to many.

12. The method of claim 11, wherein said collection type includes one of the following: Set, Array, List or Map.

13. The method of claim 1, wherein each EJB component is a Smart Component having at least one Smart Feature.

14. The method of claim 13, wherein said Smart Feature includes one of the following: SmartKey, SmartHandle and SmartValue.

15. The method of claim 1, wherein said Smart component is an eBusiness Smart Component.

16. The method of claim 1, wherein the step of transforming includes the step generating said EJB codes according to a Code Template Dictionary.

17. The method of claim 16, wherein said Code Template Dictionary includes key-value pair entries.

18. The method of claim 17, wherein values of said Code Template Dictionary represent EJB code templates.

19. The method of claim 1, wherein the step of embedding includes the step of adding business logic code between said code markers.

20. The method of claim 19, further comprising the step of synchronizing said UML model with said business logic code, thereby providing round trip engineering support.

* * * * *

UNITED STATES PATENT AND TRADEMARK OFFICE
CERTIFICATE OF CORRECTION

| | | |
|---|---|---|
| PATENT NO. | : 7,404,175 B2 | |
| APPLICATION NO. | : 09/975690 | |
| DATED | : July 22, 2008 | |
| INVENTOR(S) | : Lee et al. | |

It is certified that error appears in the above-identified patent and that said Letters Patent is hereby corrected as shown below:

On Title page, in Item 56, under "Other Publications", line 2–3, below "Dec. 1998.*" delete "Thomas, Anne, "Container-Managed Persistence," Dec. 1998, pp. 1-12.*".

On sheet 1 of 15, in Figure 1, line 1, delete "( tast)" and insert -- (.tast) --, therefor.

On sheet 7 of 15, in Figure 7, Above Box -700, line 1, delete "0.." and insert -- 0..* --, therefor.

On sheet 7 of 15, in Figure 7, Box -700, line 3, delete " {item _____} ¹ " and insert -- {item _____} --, therefor.

On sheet 10 of 15, in Figure 10, Above Box -700, line 1, delete "0.." and insert -- 0..* --, therefor.

In column 6, line 63, delete "java" and insert -- .java --, therefor.

In column 7, line 11, delete ""on"using" and insert -- "on" using --, therefor.

In column 8, line 59, after "class" insert -- . --.

In column 10, line 27, delete "(implented" and insert -- (implemented --, therefor.

In column 11, line 35, delete "Responsibility'" and insert -- Responsibility" --, therefor.

In column 15, line 49, delete "SnartKey" and insert -- SmartKey --, therefor.

In column 15, line 52, delete "OrderPk(" and insert -- OrderPk( ) --, therefor.

In column 17, line 37, delete "getIdentifrer" and insert -- getIdentifier --, therefor.

Signed and Sealed this
Twenty-seventh Day of March, 2012

David J. Kappos
*Director of the United States Patent and Trademark Office*

CERTIFICATE OF CORRECTION (continued)
U.S. Pat. No. 7,404,175 B2

In column 18, line 34–35, after "contained" insert -- . --.

In column 24, line 25, delete "BSG.Map" and insert -- BSC.Map --, therefor.

In column 23–24, Table, line 6, delete "Beame" and insert -- Beanie --, therefor.

In column 23–24, Table, line 7, delete "BeanieToyIMpl.java" and insert -- BeanieToyImpl.java --, therefor.

In column 23–24, Table, line 15, delete "Beanl" and insert -- Bean --, therefor.

In column 25–26, Table, line 8, delete "Triplmpl.java" and insert -- TripImpl.java --, therefor.

In column 25, line 63, delete "xamples." and insert -- examples. --, therefor.

In column 26, line 50, delete ",java" and insert -- .java --, therefor.

In column 27–28, Table, line 9, delete "RemoteExceptio" and insert -- RemoteException; --, therefor.

In column 27, line 50, delete "HumaiBeanPk" and insert -- HumanBeanPk --, therefor.

In column 27, line 53, delete "VeanPk);" and insert -- BeanPk); --, therefor.

In column 28, line 66, delete "setentity" and insert -- setEntity --, therefor.

In column 30, line 24, delete "Toys." and insert -- Toyses. --, therefor.

In column 30, line 29, delete "iterface" and insert -- interface --, therefor.

In column 31, line 24, delete "Remote Exception;" and insert -- RemoteException; --, therefor.

In column 32, line 1, delete "getHuman Beans" and insert -- getNextHumanBeans --, therefor.

In column 32, line 5, delete "RemoteIteraor" and insert -- RemoteIterator --, therefor.

In column 32, line 21, delete "Remote Exception" and insert -- RemoteException --, therefor.

In column 33, line 55, delete "HunanBeanses)" and insert -- HumanBeanses) --, therefor.

In column 35, line 47, in claim 3, delete "following;" and insert -- following: --, therefor.